US011782923B2

(12) United States Patent
Singh Bawa et al.

(10) Patent No.: US 11,782,923 B2
(45) Date of Patent: *Oct. 10, 2023

(54) OPTIMIZING BREAKEVEN POINTS FOR ENHANCING SYSTEM PERFORMANCE

(71) Applicant: ACCENTURE GLOBAL SOLUTIONS LIMITED, Dublin (IE)

(72) Inventors: Gurpreet Singh Bawa, Gurgaon (IN); Kaustav Pakira, Mumbai (IN); Tejas Anant Wagh, Aurangabad (IN)

(73) Assignee: ACCENTURE GLOBAL SOLUTIONS LIMITED, Dublin (IE)

(*) Notice: Subject to any disclaimer, the term of this patent is extended or adjusted under 35 U.S.C. 154(b) by 0 days.

This patent is subject to a terminal disclaimer.

(21) Appl. No.: 17/678,760

(22) Filed: Feb. 23, 2022

(65) Prior Publication Data

US 2022/0179862 A1 Jun. 9, 2022

Related U.S. Application Data

(63) Continuation of application No. 16/773,657, filed on Jan. 27, 2020, now Pat. No. 11,288,269.

(51) Int. Cl.
*G06F 17/00* (2019.01)
*G06F 16/2453* (2019.01)
*G06F 16/28* (2019.01)
*G06N 5/04* (2023.01)

(52) U.S. Cl.
CPC ...... *G06F 16/24542* (2019.01); *G06F 16/285* (2019.01); *G06N 5/04* (2013.01)

(58) Field of Classification Search
CPC ............ G06F 16/24542; G06F 16/285; G06F 16/1734; G06F 16/17; G06F 11/3006; G06F 11/3409; G06F 11/302; G06F 11/3452; G06F 11/3466; G06N 5/04
See application file for complete search history.

(56) References Cited

U.S. PATENT DOCUMENTS

| 7,882,216 | B2 | 2/2011 | Houlihan et al. |
| 9,037,924 | B2 | 5/2015 | Myrah et al. |
| 9,251,032 | B2 | 2/2016 | Kanemasa et al. |
| 10,223,228 | B2 | 3/2019 | Boss et al. |
| 11,288,269 | B2* | 3/2022 | Singh Bawa ....... G06F 11/3006 |
| 2009/0106210 | A1 | 4/2009 | Slezak et al. |

(Continued)

*Primary Examiner* — Greta L Robinson
(74) *Attorney, Agent, or Firm* — Mannava & Kang, P.C.

(57) ABSTRACT

Examples of a process optimization system are provided. The system may obtain a query from a user and process data associated with the query from a plurality of data sources. The system may identify a plurality of factors and a target variable from the process data. The system may identify a factor range for the plurality of factors. The system may deconstruct the factor range to identify a plurality of data partitions. The system may identify a data pruning activator based on the plurality of data partitions and a preponderant data partition therefrom. The system may identify a plurality of clusters associated with the preponderant data partition. The system may identify a preponderant cluster from the plurality of clusters. The system may identify a confidence score associated with the preponderant cluster. The system may generate a process optimization result based on the preponderant cluster and the confidence score.

20 Claims, 17 Drawing Sheets

(56) References Cited

U.S. PATENT DOCUMENTS

| | | |
|---|---|---|
| 2012/0191642 A1 | 7/2012 | George |
| 2018/0024859 A1 | 1/2018 | Doshi et al. |
| 2018/0241644 A1 | 8/2018 | Lu |
| 2018/0330300 A1 | 11/2018 | Runkana et al. |
| 2018/0349158 A1 | 12/2018 | Swersky et al. |
| 2019/0312800 A1 | 10/2019 | Schibler et al. |
| 2021/0049174 A1 | 2/2021 | Padmanabhan et al. |
| 2021/0065031 A1 | 3/2021 | Parikh et al. |

\* cited by examiner

| FACTOR | ESTIMATE | STD. ERROR | T VALUE | Pr(>\|t\|) | SIGNIFICANCE | STANDARDIZED BETA | ABSOLUTE |
|---|---|---|---|---|---|---|---|
| MEMORY_BANDWIDTH | 1.66E+00 | 9.68E-02 | 17.106 | <2e-16 | *** | 0.49952165 | 0.49952165 |
| CORE_SPEED | 5.33E-01 | 2.81E-02 | 18.934 | <2e-16 | *** | 0.28366544 | 0.28366544 |
| RESOLUTION_W | 8.47E-02 | 5.47E-03 | 15.49 | <2e-16 | *** | 0.27855246 | 0.27855246 |
| OPEN_GL | 1.27E+02 | 1.03E+01 | 12.255 | <2e-16 | *** | 0.24893834 | 0.24893834 |
| PIXEL_RATE | -2.23E+00 | 3.35E-01 | -6.291 | 3.57E-10 | *** | -0.16974327 | 0.16974327 |
| TEXTURE_RATE | -6.80E-01 | 1.65E-01 | -4.131 | 3.57E-05 | *** | -0.12871823 | 0.12871823 |
| PROCESS | -3.37E+00 | 3.62E-01 | -9.301 | <2e-16 | *** | -0.11429032 | 0.11429032 |
| VGA_CONNECTION | -1.16E+02 | 1.15E+01 | -10.153 | <2e-16 | *** | -0.10479542 | 0.10479542 |
| BEST_RESOLUTION_Y | -1.31E-01 | 3.46E-02 | -3.794 | 0.000151 | *** | -0.08612343 | 0.08612343 |
| HDMI_CONNECTION | 6.55E+01 | 1.11E+01 | 5.885 | 4.36E-09 | *** | 0.06362172 | 0.06362172 |
| L2_CACHE | 3.41E-02 | 7.88E-03 | 4.328 | 1.55E-05 | *** | 0.0582443 | 0.0582443 |
| SHADER | -3.34E+01 | 1.16E+01 | -2.871 | 0.004112 | ** | -0.05195669 | 0.05195669 |
| MEMORY | -6.84E-03 | 3.044E-03 | -2.246 | 0.024749 | * | -0.04086511 | 0.04086511 |
| PSU_AMPS | 1.23E+00 | 9.21E-01 | 1.341 | 0.180118 | | 0.0182327 | 0.0182327 |
| MAX_POWER | -6.87E-02 | 8.40E-02 | -0.818 | 0.413536 | | -0.014527 | 0.014527 |
| BOOST_CLOCK | -2.90E-02 | 3.58E-02 | -0.809 | 0.418454 | | -0.01099215 | 0.01099215 |

FIG. 11

OPTIMIZING BREAKEVEN POINTS FOR ENHANCING SYSTEM PERFORMANCE

PRIORITY

The present application is a continuation application of U.S. patent application Ser. No. 16/773,657, filed on Jan. 27, 2020, the disclosure of which is hereby incorporated by reference in its entirety.

BACKGROUND

The importance of server monitoring systems has increased with the rapid expansion of data and advancements in technology deployed by an organization. Various organizations across the globe have been investing a vast amount of resources into server monitoring operations for understanding digital resource usage patterns of an organization to optimize usage of digital resources for efficient management of various organizational processes. The server monitoring operations may include, for example, measuring the impact of various parameters such as, for example, memory utilization, network interface and adaptors, hardware health, and the like on a process undertaken by the server. However, it may be challenging to obtain a correct configuration combination for various parameters that may affect the performance of the server. This may include, for example, identifying and configuring parameters such as memory utilization, network interface and adaptors, hardware health, and the like. This may especially become cumbersome and complicated when the network/server system includes a high number of impacting parameters and when a majority of data pertaining to the parameters may be unstructured and iterative in nature.

Presently, organizations have been deploying various types of server monitoring approaches such as base-line dependent comparative methods, simulation-based approaches, rule-based techniques, and the like. The base-line dependent comparative methods may include manual tagging of historical instances for a process with respect to the success rate of the process. The simulation-based approaches may include chalking out hypothetical scenarios with variations in configurations and subsequent simulation of various tasks. The rule-based techniques may include outlining a fixed set of rules and outlining performance accordingly. The problem with existing approaches may be that they do not account for ambiguity and data replication caused due to overlapping factors affecting a process. Furthermore, the present approaches do not account for the stochastic and sparse nature of data, thereby leading to a less than effective convergence of data iterations.

Therefore, to ensure effectiveness, efficiency and completeness both qualitatively and quantitatively, a process optimization system may be required to ensure that overlapping and stochastic effect of data may be neutralized and process optimization parameters may be determined in a seamless manner. In addition, the conventional processes may not be efficient in reducing the manual task of process optimization and/or the time needed to perform a break-even assessment for significant factors affecting a process for process optimization. Accordingly, a technical problem with the currently available systems for process optimization may be that they may be inefficient, inaccurate, and/or may not be scalable.

SUMMARY

An embodiment of present disclosure includes a system including a processor. The processor may be coupled to the data collector, the data analyzer, the data pruner, and the confidence predictor. The data collector may implement an artificial intelligence component to identify a plurality of factors from the process data associated with each of the plurality of processes. The process data may be associated with a query and the plurality of processes. The query may indicate a process optimization requirement. The data collector may implement the artificial intelligence component to identify a target variable associated with each of the plurality of processes. The data collector may implement the artificial intelligence component to create a plurality of data domains based on mapping each of the plurality of factors with the target variable associated with each of the plurality of processes. The data analyzer may implement a first cognitive learning operation to deconstruct a factor range for each of the plurality of factors to identify a plurality of data partitions. The plurality of data partitions may include the plurality of data domains associated with the plurality of factors relevant to the target variable classified into a first set of value intervals. Using the identified plurality of data partitions, the system may generate a process optimization result. The process optimization result may include each of the plurality of processes optimized for resolution of the query.

Another embodiment of the present disclosure may include a method that includes a step of obtaining, by a processor, a query from a user. The query may indicate a process optimization requirement. The method may include a step of obtaining, by the processor, process data associated with the query and a plurality of processes from a plurality of data sources. The method may include a step of implementing, by the processor, an artificial intelligence component. The artificial intelligence component may identify a plurality of factors from process data associated with each of the plurality of processes. The artificial intelligence component may identify a target variable associated with each of the plurality of processes. The artificial intelligence component may create a plurality of data domains based on mapping each of the plurality of factors with the target variable associated with each of the plurality of processes. The method may include a step of implementing, by the processor, a first cognitive learning operation to identify a factor range associated with each of the plurality of factors. The factor range may include the plurality of data domains associated with a factor from the plurality of factors relevant to the target variable for a process from the plurality of processes. The method may include a step of implementing, by the processor, the first cognitive learning operation to deconstruct the factor range for each of the plurality of factors to identify a plurality of data partitions including the plurality of data domains associated with the plurality of factors relevant to the target variable classified into first set of value intervals. The method may include a step of generating, by the processor, using the identified plurality of data partitions, a process optimization result. The process optimization result may include each of the plurality of processes optimized for resolution of the query.

Yet another embodiment of the present disclosure may include a non-transitory computer readable medium including machine executable instructions that may be executable by a processor to obtain a query from a user. The query may indicate a process optimization requirement. The processor may obtain process data associated with the query and a plurality of processes from a plurality of data sources. The processor may implement an artificial intelligence component to identify a plurality of factors from the process data associated with each of the plurality of processes. The processor may implement the artificial intelligence component to identify a target variable associated with each of the plurality of processes. The processor may implement the artificial intelligence component to create a plurality of data domains based on mapping each of the plurality of factors with the target variable associated with each of the plurality of processes. The processor may implement a first cognitive learning operation to identify a factor range associated with each of the plurality of factors. The factor range may include the plurality of data domains associated with a factor from the plurality of factors relevant to the target variable for a process from the plurality of processes. The processor may implement the first cognitive learning operation to deconstruct the factor range for each of the plurality of factors to identify a plurality of data partitions. The plurality of data partitions may include the plurality of data domains associated with the plurality of factors relevant to the target variable classified into first set of value intervals. The processor may generate, using the identified plurality of data partitions, a process optimization result. The process optimization result may include each of the plurality of processes optimized for resolution of the query.

BRIEF DESCRIPTION OF DRAWINGS

FIG. 11 illustrates a pictorial representation of a regression modeling process for process optimization by deploying a process optimization system, according to an example embodiment of the present disclosure.

DETAILED DESCRIPTION

Figure 1:
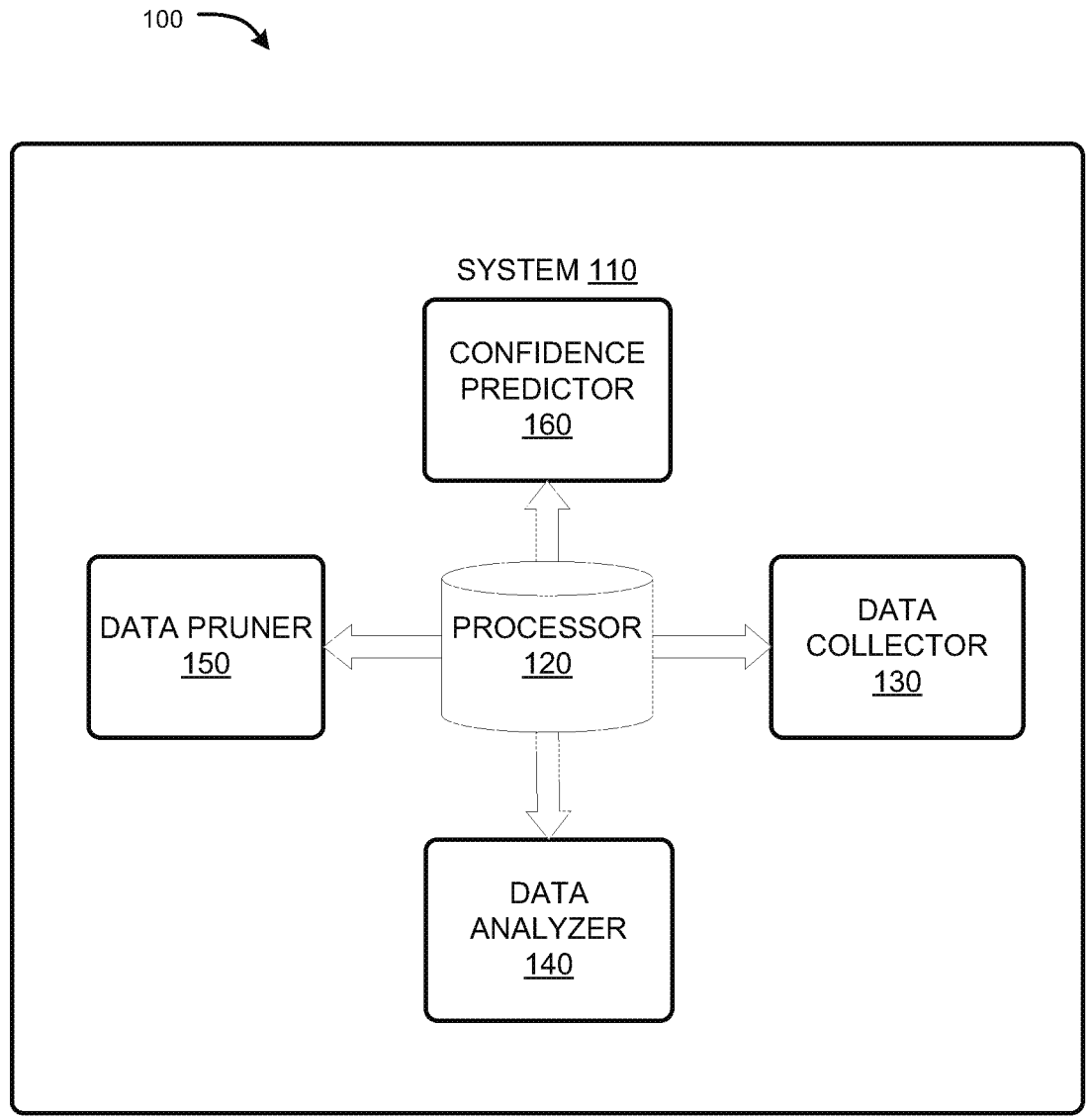
FIG. 1 illustrates a diagram for a process optimization system, according to an example embodiment of the present disclosure.

For simplicity and illustrative purposes, the present disclosure is described by referring mainly to examples thereof. The examples of the present disclosure described herein may be used together in different combinations. In the following description, details are set forth in order to provide an understanding of the present disclosure. It will be readily apparent, however, that the present disclosure may be practiced without limitation to all these details. Also, throughout the present disclosure, the terms "a" and "an" are intended to denote at least one of a particular element. The terms "a" and "an" may also denote more than one of a particular element. As used herein, the term "includes" means includes but not limited to, the term "including" means including but not limited to. The term "based on" means based at least in part on, the term "based upon" means based at least in part upon, and the term "such as" means such as but not limited to. The term "relevant" means closely connected or appropriate to what is being done or considered.

The present disclosure describes a system and method for process optimization including a process optimization system (POS). The process optimization system (referred to as "system" hereinafter) may be used for estimating a system configuration in order to identify an optimal server configuration. The system may assist in estimating the system configuration for various significant factors such as clock speed, cache memory, a spool space, a percentage uptime, a core frequency, and the like for the performance of the server. The system may estimate if the resource components may be under-utilized or over-utilized. The system may be used for monitoring system performance by checking resources management, monitoring usage patterns of resources and automated backups at predefined time periods. These actions may also help to optimize the cost for governance, security, operation and maintenance of a server. The system may be used for resource management on a real-time basis as well as for a batch process. Additionally, the system may provide a tool that may determine a confidence probability of various significant factors, thereby facilitating optimization validation.

The system may include a processor, data collector, a data analyzer, a data pruner, and a confidence predictor. The processor may be coupled to the data collector, the data analyzer, the data pruner, and the confidence predictor. The data collector may obtain a query from a user. The query may indicate a process optimization requirement. The data collector may obtain process data associated with the query from a plurality of data sources. The process data may be associated with the query and a plurality of processes. The data collector may implement an artificial intelligence component to identify a plurality of factors from the process data associated with each of the plurality of processes. The data collector may implement an artificial intelligence component to identify a target variable associated with each of the plurality of processes. The data collector may implement an artificial intelligence component to create a plurality of data domains based on mapping each of the plurality of factors with the target variable associated with each of the plurality of processes. The data analyzer may implement a first cognitive learning operation to deconstruct a factor range for each of the plurality of factors to identify a plurality of data partitions. The plurality of data partitions may include the plurality of data domains associated with the plurality of factors relevant to the target variable classified into a first set of value intervals. The factor range may be identified for each of the plurality of factors prior to deconstruction of the factor range. The factor range may include the plurality of data domains associated with a factor from the plurality of factors relevant to the target variable for a process from the plurality of processes. Using the identified plurality of data partitions, the system may generate a process optimization result. The process optimization result may include each of the plurality of processes optimized for resolution of the query.

The data pruner may identify a data pruning activator based on the plurality of data partitions. The data pruning activator may identify a preponderant data partition from the plurality of data partitions relevant to processing the query and neglect the remaining plurality of data partitions. The data pruner may implement a second cognitive learning operation to identify a plurality of clusters associated with the preponderant data partition. Each of the plurality of clusters may include the plurality of data domains associated with the preponderant data partition relevant to the target variable classified into a second set of value intervals. The data pruner may identify a preponderant cluster from the plurality of clusters based on the second set of value intervals.

The confidence predictor may implement a third cognitive learning operation to identify a confidence score associated with the preponderant cluster from the plurality of clusters. The confidence predictor may implement a third cognitive learning operation to generate the process optimization result based on the preponderant cluster from the plurality of clusters and the confidence score associated with the preponderant cluster. The process optimization result may include each of the plurality of processes optimized to the resolution of the query.

The embodiments for process optimization presented herein are exemplary in nature and should be treated as such. For the sake of brevity and technical clarity, the description of the process optimization system may be restricted to few exemplary embodiments, however, to a person or ordinary skill in the art, it should be clear that the system may be used for the fulfillment of various process optimization requirements other than those mentioned hereinafter.

Accordingly, the present disclosure aims to provide a process optimization system that may account for the various factors mentioned above, amongst others, to multi-dimensional relationships between various significant factors affecting a process in an efficient, and cost-effective manner. Furthermore, the present disclosure may categorically analyze various parameters to generate a series of break-even points for each significant factor affecting a process and present a confidence probability for each significant factor from a given process data-set in an efficient and cost-effective manner.

FIG. 1 illustrates a system 110 for process optimization (referred to as system 110 hereinafter), according to an example implementation of the present disclosure. In an example, the system 110 may include a processor 120. The processor 120 may be coupled to a data collector 130, a data analyzer 140, a data pruner 150, and a confidence predictor 160.

The system 110 may assist in estimating the configuration for various significant factors such as clock speed, cache memory, a spool space, a percentage uptime, a core frequency, and the like for the performance of the server. The system 110 may estimate if the resource components may be under-utilized or over-utilized. The system 110 may be used for monitoring a system's performance by checking resources management, monitoring usage patterns of resources and automated backups at predefined time periods. These may also help to optimize the cost for system server, governance, and security. The system 110 may be used for resource management on a real-time basis as well as for a batch process. For example, customer service and deliverables may be an important aspect of a project. A customer waiting for a service to complete may be a critical aspect of the service quality. The system 110 may find an optimal way of utilizing resources in real-time and in a batch process to reduce the negative impact of waiting. In an example, in a hybrid server configuration, there may be a development and a production environment. A job may run effectively on the development server as a process may be developed there, and the process may face challenges when a similar running configuration may be deployed in the production environment. The system 110 may provide for optimal configuration to overcome the challenges and may keep server configurations accordingly. The system 110 may assist an organization in cost optimization of digital bandwidth, which may be a major concern for large and complex applications. For example, transferring complex and intensive data over the network may require sufficient bandwidth. The system 110 may optimize the bandwidth for faster transfer of data.

In accordance with an embodiment of the present disclosure, the data collector 130 may obtain a query from a user. The query may indicate a process optimization requirement. In an example, the process optimization requirement may be associated with at least one of a process, an organization, and an industry-relevant for process optimization and break-even point determination operations. For example, the process optimization requirement may be associated with various processes of an organization. The process optimization requirement may be associated with process optimization and break-even point determination operation. In an example, the process optimization and break-even point determination operation may indicate an operation, which may refer to the purpose of constructing a structure and scheme with the objective of attaining an optimal combination of benchmarks/configuration of the factors that impact process run-time the most. In an example embodiment, the proposed structure may include units that may collect and merge data from the varying connected server processing units, capturing instances of historically run processes, their run time and associated configuration state. Additionally, the process optimization and break-even point determination operation may include identifying a preferential rank ordering among all the factors/configuration affecting the process run time. The process optimization and break-even point determination operation may include constructing tree-based machine learning models for a set of significant factors obtained from the rank order to arrive at the breakeven points for each, at which optimal process run time may be achieved. The significant factors may refer to a set of measurable factors that may affect a process. The system 110 may be configured such that the process optimization and break-even point determination operation may include receiving input on the specific server component/factor to be optimized, and the associated breakeven point, the expected impact on the process run time and the confidence probability for the same may be accordingly provided as output. This may help the user to arrange the best possible configuration for performing related tasks on the server.

The data collector 130 may obtain process data associated with the query from a plurality of data sources. The process data may be associated with each of the plurality of processes. The process data may be digital data collected from a variety of instances of various processes being run on different servers in an organization with different settings/configurations to capture maximum possible variation in the data for achieving the purpose of the process optimization requirement. The process data may be associated with a plurality of processes. The process data may be historical data associated with the plurality of processes and instances of the plurality of processes being run on different servers in an organization. The plurality of processes may refer to various processes, operations, and activities that may be carried out within/through an organization. The plurality of data sources may include various servers across an organization deployed for data storage. The plurality of data sources may include various cloud-based platforms deployed by an organization for data storage.

The data collector 130 may implement an artificial intelligence component to identify a plurality of factors from the process data associated with each of the plurality of processes. In accordance with various embodiments of the present disclosure, the artificial intelligence component may include artificial intelligence techniques, for example, a neural network approach, a machine learning approach, and the like. The artificial intelligence component may be implemented with respect to data identification and extraction. The artificial intelligence component may capture the layout as well as segments of data from digitized data as structured data along with the method for identifying the various process data components. The artificial intelligence techniques, (e.g. a neural network, a machine learning approach) may evaluate the layout of a process from the plurality of processes. The neural network approach may include, for example, deployment of a Convolution Neural Network (CNN). This approach may be referred to hereinafter as the "CNN based approach". The machine learning approach for evaluating the plurality of processes may include a complete text-based method. In this method, digitized text may be extracted from the process data and the plurality of factors may be identified depending upon a process from the plurality of processes.

The plurality of factors may include any of the measurable attributes used to measure the performance of various components associated with each of the plurality of processes. For the sake of brevity, and technical clarity, the word "process" may be used hereinafter to described "a process from the plurality of processes". In an example, the plurality of factors may include process indicators such as clock speed, cache memory, spool space, percentage uptime, core frequency, and the like. In an example, the plurality of factors may include factors that may exhibit a high degree of correlation to the performance of the server. In accordance with various embodiments of the present disclosure, the performance of the server may be measured in terms of a process runtime for a given set of input and output parameters. A process with a low process runtime may be considered more optimal as compared to a process with a higher process runtime. The data collector 130 may implement the artificial intelligence component to identify the plurality of factors that may reduce the process run time for the process. The embodiments mentioned herein for the plurality of factors are exemplary in nature and should be treated as such. It should be clear to a person skilled in the art that the plurality of factors may include any of the measurable parameters associated with a process.

The data collector 130 may implement the artificial intelligence component to identify a target variable associated with each of the plurality of processes. The target variable may be a measurable parameter that may be used as an indicator against which the plurality of factors may be measured and mapped. For example, the target variable may be the process runtime. As mentioned above, the system 110 may attempt to maximize the productivity of performance for the process, and the parameter for such measurement may be, for example, a process run time. The system 110 may determine the process run time for each process instance, and the associated plurality of factors for process optimization. The target variable may be the parameter that may be used for calculation breakeven points for each of the plurality of factors by the system 110. The breakeven points may refer to a particular value of each of the plurality of factors for which the target variable such as the process runtime may be both optimized as well as statistically stable.

The data collector 130 may implement the artificial intelligence component to create a plurality of data domains based on mapping each the plurality of factors with the target variable associated with each of the plurality of processes. The data collector 130 may implement the artificial intelligence component to sort the process data to create a merged, harmonized and collated into a database that may provide a view of the process from multiple dimensions. The system 110 may determine a target variable value of the target variable, for example, a value of the process runtime for each entry present in the database mentioned above to create the plurality of data domains. The data collector 130 may update the plurality of data domains based on an update in the process data. In an example, the system 110 may obtain the process data on a real time basis.

In accordance with various embodiments of the present disclosure, the data collector 130 may implement the artificial intelligence component to determine a priority score for each the plurality of factors. The priority score may be determined based on the target variable associated with each of the plurality of processes. Further, the data collector 130 may identify a threshold value based on the priority score each the plurality of factors. The priority score may be used to prioritize the plurality of factors associated with each of the plurality of processes based on the target variable associated with each of the plurality of processes and deploy the plurality of factors with a higher priority for resolution of the query. The threshold value may a value of the priority score that may be use to select the plurality of factors for the resolution of the query. For example, while there may be the plurality of factors associated with the execution of every process, all of the plurality of factors may not be significantly impacting the target variable like the process run time. The artificial intelligence component may be implemented to identify the plurality of factors that may be materially affecting the target variable such as the performance of a process in terms of the process runtime. In an example, the artificial intelligence component may include implementing techniques such as Mean Decrease Gini and IV, Varclus, and the like for prioritizing the plurality of factors (explained further by way of subsequent FIGs.). An organization may strive to continuously attain a correct configuration combination for the plurality of factors that may affect performance the most by tuning the factors that show maximum influence on them. This may be complicated when the network/server system consists of a high number of impacting factors and when a majority of relevant data is unstructured. The system 110 may implement the artificial intelligence component to create a routine/workflow which may identify a preferential rank ordering on the plurality of factors to apply for the resolution of the query and achieve process optimization. The plurality of factors that may explain maximum variability in the target variable (here, process run time) may be treated first by the system 110. The artificial intelligence component may include an ensemble of non-linear models, wherein, the function may be created through a series of approximations (iterations) without assumptions, thereby eliminating all the related set-backs associated with the same.

The data analyzer 140 may implement a first cognitive learning operation to identify a factor range associated with each of the plurality of factors. The factor range may be including the plurality of data domains associated with a factor from the plurality of factors relevant to the target variable for a process from the plurality of processes. The first cognitive learning operation may include machine learning-based algorithms that may process the data present in the plurality of data domains. As mentioned above, the plurality of data domains may include the target variable value associated with each of the plurality of factors associated with a process. The data analyzer 140 may identify the plurality of factors associated with a process and retrieve the associated target variable value for the plurality of factors from the preferential rank ordering. The data analyzer 140 may arrange the target variable values for the plurality of factors from the preferential rank ordering to determine the factor range. The factor range may include the target variable values from the plurality of data domains associated with the plurality of factors from the preferential rank ordering. The data analyzer 140 may obtain a user input to implement the first cognitive learning operation for identifying the factor range associated with each of the plurality of factors. The data analyzer 140 may update the factor range associated with each of the plurality of factors based on an update in the plurality of data domains associated with a factor from the plurality of factors relevant to the target variable for a corresponding process from the plurality of processes.

The data analyzer 140 may implement the first cognitive learning operation to deconstruct the factor range for each of the plurality of factors to identify a plurality of data partitions including the plurality of data domains associated with the plurality of factors relevant to the target variable classified into the first set of value intervals. As mentioned above, the factor range may include the target variable values from the plurality of data domains associated with the plurality of factors from the preferential rank ordering. The data analyzer 140 may implement the first cognitive learning operation to divide the factor range in the plurality of data partitions. The data analyzer 140 may identify the first set of value intervals from the factor range. For example, the factor range may include target variable values associated with the process runtime for the plurality of factors from the preferential rank ordering. The data analyzer 140 may create the first set of value intervals for the segregation of the target variable values associated with the process runtime for the plurality of factors from the preferential rank ordering. The plurality of data partitions may refer to each of the segregated blocks of the target variable values associated with the target variable such as the process runtime for the plurality of factors from the preferential rank ordering (explained in detail by way of subsequent FIGs.). In an example, the data analyzer 140 may identify the first set of value intervals based on a variation range of the mapping of each the plurality of factors with the target variable associated with each of the plurality of processes. The data analyzer 140 may implement the first cognitive learning operation to identify a minimum value from the target variable values and a maximum value from the target variable values. The data analyzer 140 may determine a difference between the maximum target variable value and the minimum target variable value. The data analyzer 140 may identify the first set of value intervals based on the difference between the maximum target variable value and the minimum target variable value. The data analyzer 140 may identify a different first set of value intervals for each of the plurality of factors.

In accordance with various embodiments of the present disclosure, the data analyzer 140 may iteratively deconstruct the factor range for each of the plurality of factors to identify the plurality of data partitions until a terminal partition may be identified. The terminal partition may refer to a partition that may include a minimum permissible size of a value interval from the first set of value intervals. The first cognitive learning operation may include a technique called binary recursive partitioning (explained in detail by way of subsequent FIGs.) for creating the plurality of data partitions until the terminal partition may be determined. The data analyzer 140 may deploy the plurality of data partitions and the terminal partition to construct a decision tree including the plurality of data partitions arranged based on the first set of value intervals. The data analyzer 140 may arrange each of the plurality of data partitions in form of a decision tree (explained in detail by way of subsequent FIGs.). The data analyzer 140 may illustrate a change in partition level with the creation of every new data partition.

The data pruner 150 may identify a data pruning activator based on the plurality of data partitions and associated with each of the plurality of factors. The data pruning activator may be a complexity parameter (explained in detail by way of subsequent FIGs.) determined by the data pruner 150. For example, the data analyzer 140 may iteratively deconstruct the factor range and create the plurality of data partitions. The data analyzer 140 may continue to split each data partition from the plurality of data partitions until the terminal partition may be determined. Subsequently, the data pruner 150 may determine the data pruning activator to remove a plurality of data partitions that do not add any significance to the plurality of data partitions with respect to the resolution of the query (explained in detail by way of subsequent FIGs.). The data pruning activator may identify a preponderant data partition from the plurality of data partitions relevant to processing the query and neglect the remaining plurality of data partitions. The preponderant data partition may be the data partition most significant with respect to the resolution of the query. For example, the preponderant data partition may include the target variable values corresponding to a minimum process runtime. In an example, the decision tree may facilitate identification of the preponderant data partition.

The data pruner 150 may implement a second cognitive learning operation to identify a plurality of clusters associated with the preponderant data partition. In an example, the data analyzer 140 may deploy the plurality of data partitions and the terminal partition to construct a decision tree including the plurality of partitions arranged based on the first set of value intervals. The preponderant data partition may include target variable values corresponding to a minimum process runtime. The target variable values presented therein may belong to a set of value intervals from the first set of value intervals. The data pruner 150 may implement the second cognitive learning operation to further segregate the preponderant data partition into the plurality of clusters. The second cognitive learning operation may include machine learning-based algorithms that may process the data present in the preponderant data partition and the plurality of clusters. In an example, each of the plurality of clusters may be including the plurality of data domains associated with the preponderant data partition relevant to the target variable classified into a second set of value intervals. The plurality of clusters may include the target variable values from the preponderant data partition associated with the target variable such as the process runtime for the plurality of factors from the preferential rank ordering. The data pruner 150 may identify the second set of value intervals for classifying the target variable values present in the preponderant data partition. In accordance with various embodiments of the present disclosure, the data pruner 150 may identify the second set of value intervals based on deconstructing a value interval from the first set of value intervals (explained in detail by way of subsequent FIGs.). The data pruner 150 may identify a preponderant cluster from the plurality of clusters based on the second set of value intervals. The preponderant cluster may be the cluster from the plurality of clusters that may be most significant to the resolution of the query (explained in detail by way of subsequent FIGs.). As mentioned above, the target variable values corresponding to optimized process run time for a given set of input and output parameters may be referred to as the break-even point for that specific factor from the plurality of factors. The preponderant cluster may include the break-even point of the target variable for a factor from the plurality of factors based on the preferential rank ordering (explained in detail by way of subsequent FIGs.).

The confidence predictor 160 may implement a third cognitive learning operation to identify a confidence score associated with the preponderant cluster from the plurality of clusters. The third cognitive learning operation may include machine learning-based algorithms that may process the data present in the preponderant cluster. The confidence score may refer to the confidence probability associated with the corresponding breakeven point of the target variable for a factor from the plurality of factors based on the preferential rank ordering (explained in detail by way of subsequent FIGs.). In accordance with various embodiments of the present disclosure, the confidence predictor 160 may identify the confidence score to include a correlation between the plurality of factors associated with the preponderant cluster and the associated target variable. The system 110 may be configured such that higher the degree of correlation between a factor and the target variable, for example, the process runtime, the higher the confidence score. The confidence predictor 160 may implement the third cognitive learning operation to generate a process optimization result based on the preponderant cluster from the plurality of clusters and the confidence score associated with the preponderant cluster (explained in detail by way of subsequent FIGs.). The process optimization result including each of the plurality of processes optimized to the resolution of the query.

The embodiments for the artificial intelligence component, the first cognitive learning operation, the second cognitive learning operation, and the third cognitive learning operation presented herein are exemplary in nature and should be treated as such. For the sake of brevity and technical clarity, the description of the process optimization system may be restricted to few exemplary embodiments, however, to a person skilled in the art it should be clear that the system may be used for the fulfillment of various process optimization requirements other than those mentioned hereinafter.

Figure 2:
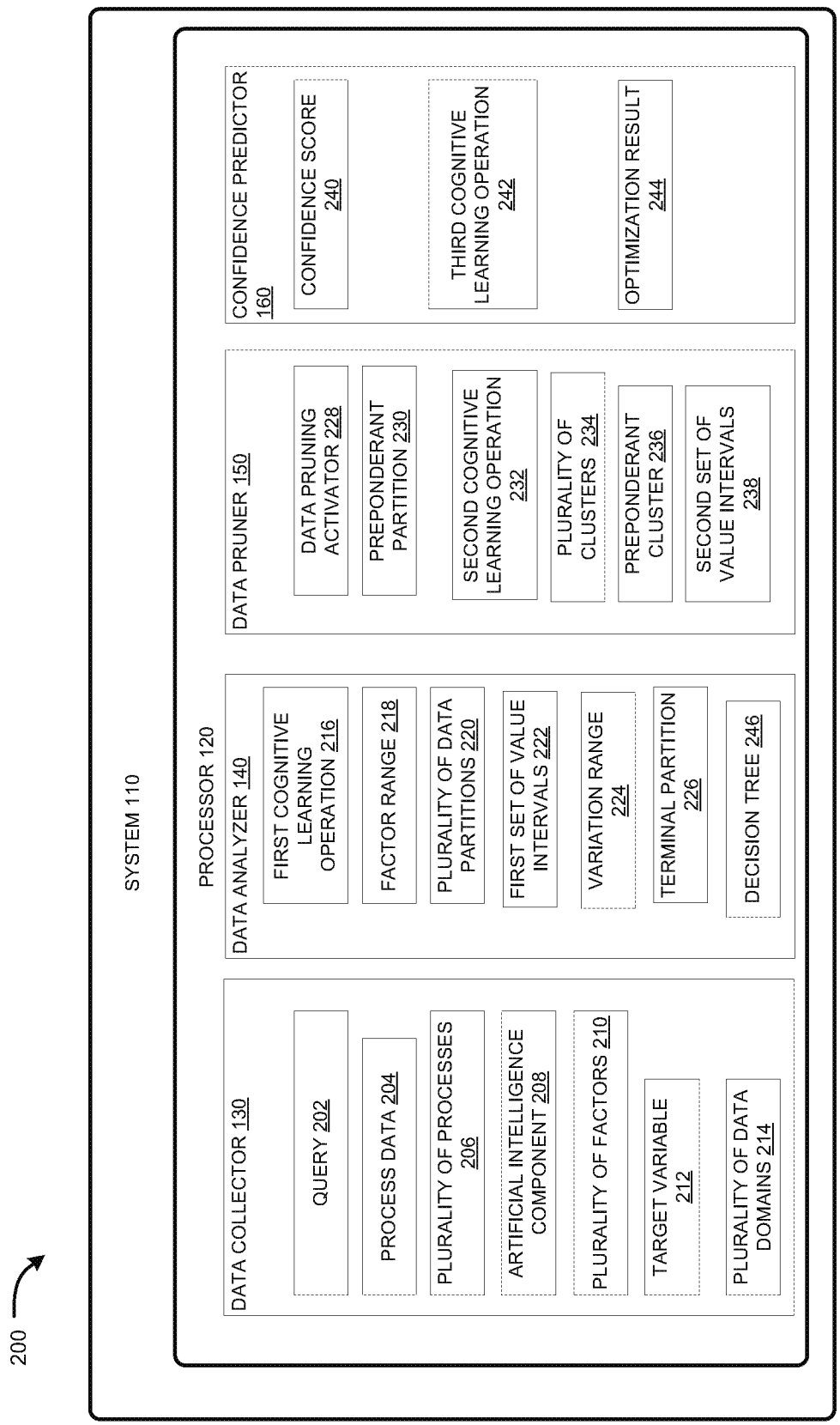
FIG. 2 illustrates various components of a process optimization system, according to an example embodiment of the present disclosure.

FIG. 2 illustrates various components of the process optimization system 110, according to an example embodiment of the present disclosure. In an example, the system 110 may include the processor 120. The processor 120 may be coupled to the data collector 130, the data analyzer 140, the data pruner 150, and the confidence predictor 160.

In accordance with an embodiment of the present disclosure, the data collector 130 may obtain a query 202 from a user. The query 202 may indicate a process optimization requirement. In an example, the process optimization requirement may be associated with at least one of a process, an organization, and an industry-relevant for process optimization and break-even point determination operations. For example, the process optimization requirement may be associated with various processes of an organization. The process optimization requirement may be associated with process optimization and break-even point determination operation. In an example, the process optimization and break-even point determination operation may indicate an operation. This may refer to the purpose of constructing a structure and scheme with the objective of attaining an optimal combination of benchmarks/configuration of the factors that most impact process run-time. In an example, the proposed structure may consist of units that may collect and merge data from the varying connected server processing units, capturing instances of historically run processes, their run time and associated configuration state. Additionally, the process optimization and break-even point determination operation may include identifying a preferential rank ordering among all the factors/configuration affecting the process run time. The process optimization and break-even point determination operation may include constructing tree-based machine learning models for a set of significant factors. The set of significant factors may be obtained from rank order to arrive at the breakeven points for each, at which optimal process run time may be achieved. The significant factors may refer to a set of measurable factors that may affect a process. The system 110 may be configured such that the process optimization and break-even point determination operation may include receiving input on the specific server component/factor to be optimized, and the associated breakeven point, the expected impact on the process run time and the confidence probability for the same may be accordingly provided as output. This may help the user to arrange the best possible configuration for performing related tasks on the server.

The data collector 130 may obtain process data 204 associated with the query 202 from a plurality of data sources. The process data 204 may be digital data collected from a variety of instances of various processes being run on different servers in an organization. The servers may include different settings/configurations to capture maximum possible variation in the data for achieving the purpose of the process optimization requirement. The process data 204 may be associated with a plurality of processes 206. The process data 204 may be historical data associated with the plurality of processes 206 and instances of the plurality of processes 206 being run on different servers in an organization. The plurality of processes 206 may refer to various processes, operations, and activities that may be carried out within/through an organization.

The data collector 130 may implement an artificial intelligence component 208 to identify a plurality of factors 210 from the process data 204 associated with each of the plurality of processes 206. In accordance with various embodiments of the present disclosure, the artificial intelligence component 208 may include artificial intelligence techniques, for example, a neural network approach, a machine learning approach, and the like. The artificial intelligence component 208 may be implemented with respect to data identification and extraction. The artificial intelligence component 208 may capture all the layout as well as segments of data from digitized data into structured data along with the method for identifying the various process data 204 components. The artificial intelligence techniques, for example, a neural network, a machine learning approach may evaluate the layout of a process from the plurality of processes 206. The neural network approach may include, for example, deployment of a Convolution Neural Network (CNN). This approach may be referred to hereinafter as the "CNN based approach. The machine learning approach for evaluating the plurality of processes 206 may include a complete text-based method where a digitized text may be extracted from the process data 204 and the plurality of factors 210 may be identified depending upon a process from the plurality of processes 206.

The plurality of factors 210 may include any of the measurable attributes used to measure the performance of various components associated with each of the plurality of processes 206. For the sake of brevity, and technical clarity, the word "process" may be used hereinafter to described "a process from the plurality of processes 206". In an example, the plurality of factors 210 may include process indicators such as clock speed, cache memory, spool space, percentage uptime, core frequency, and the like. In an example, the plurality of factors 210 may include factors that may exhibit a high degree of correlation to the performance of the server. In accordance with various embodiments of the present disclosure, the performance of the server may be measured in terms of a process runtime for a given set of input and output parameters. A process with a low process runtime may be considered more optimal as compared to a process with a higher process runtime. The data collector 130 may implement the artificial intelligence component 208 to identify the plurality of factors 210 that may reduce the process run time for the process. The embodiments mentioned herein, for the plurality of factors 210 are exemplary in nature and should be treated as such. It should be clear to a person skilled in the art that the plurality of factors 210 may include any of the measurable parameters associated with a process.

The data collector 130 may implement the artificial intelligence component 208 to identify a target variable 212 associated with each of the plurality of processes 206. The target variable 212 may be a measurable parameter that may be used as an indicator against which the plurality of factors 210 may be measured and mapped. For example, the target variable 212 may be the process runtime. As mentioned above, the system 110 may attempt to maximize the productivity of performance for the process, the parameter for such measurement may be, for example, a process run time. The system 110 may determine the process run time for each process instance, and the associated plurality of factors 210 for process optimization. The target variable 212 may be the parameter that may be used for calculation breakeven points for each of the plurality of factors 210 by the system 110. The breakeven points may refer to a particular value of each of the plurality of factors 210 for which the target variable 212 such as the process runtime may be both optimized as well as statistically stable.

The data collector 130 may implement the artificial intelligence component 208 to create a plurality of data domains 214 based on mapping each the plurality of factors 210 with the target variable 212 associated with each of the plurality of processes 206. The data collector 130 may implement the artificial intelligence component 208 to sort the process data 204 to create a merged, harmonized and collated into a database that may provide an all-round view of the process from as many dimensions as possible. The system 110 may determine a target variable value of the target variable 212, for example, a value of the process runtime for each entry present in the database mentioned above to create the plurality of data domains 214. The data collector 130 may update the plurality of data domains 214 based on an update in the process data 204. In an example, the system 110 may obtain the process data 204 on a real time basis In accordance with various embodiments of the present disclosure, the data collector 130 may implement the artificial intelligence component 208 to determine a priority score for each the plurality of factors 210 based on the target variable 212 associated with each of the plurality of processes 206 and identify a threshold value based on the priority score of each the plurality of factors. The priority score may be used to prioritize the plurality of factors 210 associated with each of the plurality of processes 206 based on the target variable 212 associated with each of the plurality of processes 206 and deploy the plurality of factors 210 with a higher priority for resolution of the query 202. The threshold value may a value of the priority score that may be used to select the plurality of factors 210 for the resolution of the query 202. For example, the plurality of factors 210 above the threshold value may be selected by the system 110 for resolution of the query. In an example, the plurality of factors 210 below the threshold value may be selected by the system 110 for resolution of the query 202. For example, there may be the plurality of factors 210 associated with the execution of every process, although all of the plurality of factors 210 may be not significantly impact the target variable 212 like the process run time. The artificial intelligence component 208 may be implemented to identify the plurality of factors 210 that may be majorly affecting the target variable 212 such as the performance of a process in terms of the process runtime. In an example, the artificial intelligence component 208 may include implementing techniques such as Mean Decrease Gini and IV, Varclus, and the like for prioritizing the plurality of factors 210. The organizations may be striving to continuously attain a correct configuration combination for the plurality of factors 210 that may affect performance the most by tuning the factors that show maximum influence on them. This may be complicated when the network/server system consists of a high number of impacting factors and when majority data may be unstructured. The system 110 may implement the artificial intelligence component 208 to create a routine/ workflow which may identify a preferential rank ordering on the plurality of factors 210 to apply for the resolution of the query 202 and achieve process optimization. The plurality of factors 210 that may explain maximum variability in the target variable 212 (here, the process run time) may be treated first by the system 110. The artificial intelligence component 208 may include an ensemble of non-linear models, wherein, the function may be created through a series of approximations (iterations) without assumptions, thereby eliminating all the related set-backs associated with the same.

In an example, the artificial intelligence component 208 may perform data harmonization on the process data 204. As mentioned above, the plurality of processes 206 running in an organization may all run in different systems having different configurations, different states, different settings, and the like. Additionally, each of the different configurations, different states, and different settings may have a unique value for the process runtime. The artificial intelligence component 208 may collect and merge all such different configurations, different states, different settings for each process as a server analytics record (SAR) (explained in further detail by way of FIG. 9). In an example, the artificial intelligence component 208 may perform variable selection and regression modeling for identifying the plurality of factors 210 and the target variable 212. The instances from the SAR may be processed, cleaned and normalized by the implementation of the artificial intelligence component 208. The system 110 may implement techniques such as Mean Decrease in Gini and IV, and Varclus for deriving the preferential ranking order for the plurality of factors 210 such as a memory size, a clock speed, a cache memory, and a boost clock. The Mean Decrease in Gini may refer to average (mean) of a variable's total decrease in node impurity, weighted by the proportion of samples reaching that node in each individual decision tree in a random forest method. A higher Mean Decrease in Gini may indicate higher variable importance. In an example embodiment, Varclus procedure may be used as a variable-reduction method. A large set of variables such as the plurality of factors 210 may often be replaced by the set of cluster components with little loss of information. The artificial intelligence component 208 may process the day transformed data as derived from normalization by the deployment of various non-linear progression models. A few examples of non-linear progression models may include Spline regression, and Ridge and Lasso regression. The Spline regression may refer to a non-parametric regression technique that may be seen as an extension of linear models that automatically models nonlinearities and interactions between variables. The Ridge and Lasso regression may be a simple technique to reduce model complexity and prevent over-fitting which may result from simple linear regression. In an example, multiple non-linear regression models may be built from the transformed data. The plurality of factors 210 may then be ranked based on the combined significance levels from each of the models (few examples mentioned above), reflecting their importance on affecting the target variable 212 such as process runtime (described in further detail by way of FIG. 10). The embodiments presented in this document for regression modeling may be exemplary in nature, and the system 110 may deploy any of the non-linear regression models for the resolution of the query 202.

The data analyzer 140 may implement a first cognitive learning operation 216 to identify a factor range 218 associated with each of the plurality of factors 210. The factor range 218 may be including the plurality of data domains 214 associated with a factor from the plurality of factors 210 relevant to the target variable 212 for a process from the plurality of processes 206. The first cognitive learning operation 216 may include machine learning-based algorithms that may process the data present in the plurality of data domains 214. In accordance with various embodiments of the present disclosure, the machine learning-based algorithms may include a classification and regression tree (CART) algorithm, a Chi Squared Automatic Interaction Detector (CHAID). The CART algorithm may be an algorithm that may be structured as a sequence of questions, the answers to which may determine what the next question, if there may be any. The result of these questions may be arranged in a tree like structure, where nodes at bottom of the tree may be referred to as a set of terminal nodes at which point there may not be any further questions. In an example, the questions may be automatically generated by the CART algorithms. The CHAID algorithm may be an algorithm used for discovering relationships between a categorical response variable and other categorical predictor variables. The CHAID algorithm may be useful when a user may require patterns in datasets with a plurality of categorical variables and this may be an effective algorithm for summarizing the data as the various data relationships may easily be visualized.

As mentioned above, the plurality of data domains 214 may include the target variable value associated with each of the plurality of factors 210 associated with a process. The data analyzer 140 may identify the plurality of factors 210 associated with a process and retrieve the associated target variable value for the plurality of factors 210 from the preferential rank ordering. The data analyzer 140 may arrange the target variable values for the plurality of factors 210 from the preferential rank ordering to determine the factor range 218. The factor range 218 may include the target variable values from the plurality of data domains 214 associated with the plurality of factors 210 from the preferential rank ordering. In accordance with various embodiments of the present disclosure, the data analyzer 140 may obtain user input to implement the first cognitive learning operation 216 for identifying the factor range 218 associated with each of the plurality of factors 210. In accordance with various embodiments of the present disclosure, the data analyzer 140 may update the factor range 218 associated with each of the plurality of factors 210 based on an update in the plurality of data domains 214 associated with a factor from the plurality of factors 210 relevant to the target variable 212 for a process from the plurality of processes 206.

The data analyzer 140 may implement the first cognitive learning operation 216 to deconstruct the factor range 218 for each of the plurality of factors 210 to identify a plurality of data partitions 220 including the plurality of data domains 214 associated with the plurality of factors 210 relevant to the target variable 212 classified into a first set of value intervals 222. As mentioned above, the factor range 218 may include the target variable values from the plurality of data domains 214 associated with the plurality of factors 210 from the preferential rank ordering. The data analyzer 140 may implement the first cognitive learning operation 216 to divide the factor range 218 in the plurality of data partitions 220. The data analyzer 140 may identify the first set of value intervals 222 from the factor range 218. For example, the factor range 218 may include target variable values associated with the process runtime for the plurality of factors 210 from the preferential rank ordering. The data analyzer 140 may create the first set of value intervals 222 for the segregation of the target variable values associated with the process runtime for the plurality of factors 210 from the preferential rank ordering. The plurality of data partitions 220 may refer to each of the segregated blocks of the target variable values associated with the target variable 212 such as the process runtime for the plurality of factors 210 from the preferential rank ordering (explained in detail by way of subsequent FIGs.). In an example, the data analyzer 140 may identify the first set of value intervals 222 based on a variation range 224 of the mapping of each the plurality of factors 210 with the target variable 212 associated with each of the plurality of processes 206. The data analyzer 140 may implement the first cognitive learning operation 216 to identify a minimum value from the target variable values and a maximum value from the target variable values. The data analyzer 140 may determine a difference between the maximum target variable value and the minimum target variable value. The data analyzer 140 may identify the first set of value intervals 222 based on the difference between the maximum target variable value and the minimum target variable value. The data analyzer 140 may identify a different first set of value intervals 222 for each of the plurality of factors 210.

In accordance with various embodiments of the present disclosure, the data analyzer 140 may iteratively deconstruct the factor range 218 for each of the plurality of factors 210 to identify the plurality of data partitions 220 until a terminal partition 226 may be identified. The terminal partition 226 may refer to a partition that may include a minimum permissible size of a value interval from the first set of value intervals 222. The first cognitive learning operation 216 may include a technique called binary recursive partitioning (explained in detail by way of subsequent FIGs.) for creating the plurality of data partitions 220 until the terminal partition 226 may be determined. In accordance with various embodiments of the present disclosure, the data analyzer 140 may deploy the plurality of data partitions 220 and the terminal partition 226 to construct a decision tree 246 including the plurality of data partitions 220 arranged based on the first set of value intervals 222. The data analyzer 140 may arrange each of the plurality of data partitions 220 in form of a decision tree 246 (explained in detail by way of subsequent FIGs.) wherein, the data analyzer 140 may illustrate a change in partition level with the creation of every new data partition. In an example, the decision tree 246 may facilitate identification of the preponderant data partition. In accordance with various embodiments of the present disclosure, the decision tree 246 may be constructed by implementing one of the CART algorithm and the CHAID algorithm.

The data pruner 150 may identify a data pruning activator 228 based on the plurality of data partitions 220 and associated with each of the plurality of factors 210. The data pruning activator 228 may be a complexity parameter determined by the data pruner 150. For example, the data analyzer 140 may iteratively deconstruct the factor range 218 and create the plurality of data partitions 220. The data analyzer 140 may continue to split each data partition from the plurality of data partitions 220 until the terminal partition 226 may be determined. Subsequently, the data pruner 150 may determine the data pruning activator 228 to remove the plurality of data partitions 220 that may not add any significance to the plurality of data partitions 220 with respect to the resolution of the query 202 (explained in detail by way of subsequent FIGs.). The data pruning activator 228 may identify a preponderant data partition 230 from the plurality of data partitions 220 relevant to processing the query 202 and neglect the remaining plurality of data partitions 220.

The preponderant data partition 230 may be the data partition most significant with respect to the resolution of the query 202. For example, the preponderant data partition 230 may include the target variable values corresponding to a minimum process runtime. In an example, the decision tree is to facilitate identification of the preponderant data partition.

The data pruner 150 may implement a second cognitive learning operation 232 to identify a plurality of clusters 234 associated with the preponderant data partition 230. The preponderant data partition 230 may include target variable values corresponding to a minimum process runtime. The target variable values presented therein may belong to a set of value intervals from the first set of value intervals 222. The data pruner 150 may implement the second cognitive learning operation 232 further segregate the preponderant data partition 230 into the plurality of clusters 234. The second cognitive learning operation 232 may include machine learning-based algorithms that may process the data present in the preponderant data partition 230 and the plurality of clusters 234. In an example, the second cognitive learning operation 232 may include implementing an algorithm such as a constrained classification and regression tree algorithm, a constrained chi squared automatic interaction detector algorithm, and the like to process the data present in the preponderant data partition 230 and the plurality of clusters 234. The constrained classification and regression tree algorithm may be the CART algorithm that may be constrained by a predictor. The constrained chi squared automatic interaction detector algorithm may be the CHAID algorithm that may be constrained by a predictor. In an example, each of the plurality of clusters 234 may be including the plurality of data domains 214 associated with the preponderant data partition 230 relevant to the target variable 212 classified into a second set of value intervals 238. The plurality of clusters 234 may be including the target variable values from the preponderant data partition 230 associated with the target variable 212 such as the process runtime for the plurality of factors 210 from the preferential rank ordering. The data pruner 150 may identify the second set of value intervals 238 for classifying the target variable values present in the preponderant data partition 230. In accordance with various embodiments of the present disclosure, the data pruner 150 may identify the second set of value intervals 238 based on deconstructing a value interval from the first set of value intervals 222 (explained in detail by way of subsequent FIGs.). The data pruner 150 may identify a preponderant cluster 236 from the plurality of clusters 234 based on the second set of value intervals 238. The preponderant cluster 236 may be the cluster from the plurality of clusters 234 that may be most significant to the resolution of the query 202. (explained in detail by way of subsequent FIGs.). As mentioned above, the target variable values corresponding to optimized process run time for a given set of input and output parameters may be referred to as the break-even point for that specific factor from the plurality of factors 210. The preponderant cluster 236 may include the break-even point of the target variable 212 for a factor from the plurality of factors 210 based on the preferential rank ordering (explained in detail by way of subsequent FIGs.).

The confidence predictor 160 may implement a third cognitive learning operation 242 to identify a confidence score 240 associated with the preponderant cluster 236 from the plurality of clusters 234. The third cognitive learning operation 242 may include an enumerative point estimation exercise that may process the data present in the preponderant cluster 236. The confidence score 240 may refer to the confidence probability associated with the corresponding breakeven point of the target variable 212 for a factor from the plurality of factors 210 based on the preferential rank ordering (explained in detail by way of subsequent FIGs.). In accordance with various embodiments of the present disclosure, the confidence predictor 160 may identify the confidence score 240 to include a correlation between the plurality of factors 210 associated with the preponderant cluster 236 and the associated target variable 212. The system 110 may be configured such that higher the degree of correlation between a factor and the target variable 212 for example, the process runtime, higher the confidence score 240. The confidence predictor 160 may implement the third cognitive learning operation 242 to generate a process optimization result 244 based on the preponderant cluster 236 from the plurality of clusters 234 and the confidence score 240 associated with the preponderant cluster 236 (explained in detail by way of subsequent FIGs.). The process optimization result 244 including each of the plurality of processes 206 optimized to the resolution of the query 202.

The embodiments for the artificial intelligence component 208, the first cognitive learning operation 216, the second cognitive learning operation 232, and the third cognitive learning operation 242 presented herein are exemplary in nature and should be treated as such. For the sake of brevity and technical clarity, the description of the process optimization system may be restricted to few exemplary embodiments, however, to a person skilled in the art it should be clear that the system may be used for the fulfillment of various process optimization requirements other than those mentioned hereinafter.

In operation, the system 110 may be used for the optimization of various processes in an organization for maximum productivity with minimum utilization of resources. The system 110 may include the data collector 130 to obtain a query 202 from a user. The query 202 may be indicating a process optimization requirement. The data collector 130 may obtain process data 204 associated with the query 202 from a plurality of data sources. The process data 204 may be digital data collected from a variety of instances of various processes being run in an organization to capture maximum possible variation in the data for achieving the purpose of the process optimization requirement. The data collector 130 may implement the artificial intelligence component 208 to identify a plurality of factors 210 from the process data 204 associated with each of the plurality of processes 206. The data collector 130 may implement the artificial intelligence component 208 to identify the target variable 212 associated with each of the plurality of processes 206. The artificial intelligence component 208 may prioritize the plurality of factors 210 and derive the preferential ranking order of the plurality of factors 210. The preferential ranking order may include the plurality of factors 210 that may have a maximum impact on the process to be optimized. The system 110 may deploy the plurality of factors 210 as indicated by the preferential ranking order hereon for process optimization. The data collector 130 may implement the artificial intelligence component 208 to create the plurality of data domains 214 based on mapping each of the plurality of factors 210 with the target variable 212. The plurality of data domains 214 may include the target variable value for each of the plurality of factors 210 with respect to the target variable 212 for various process settings. The system 110 may include the data analyzer 140 that may implement the first cognitive learning operation 216 to identify the factor range 218 associated with each of the plurality of factors 210. The factor range 218 may include the target variable values from the plurality of data domains 214 associated with the plurality of factors 210 from the preferential rank ordering. In an example, the data analyzer 140 may obtain the user input to implement the first cognitive learning operation 216 for identifying the factor range 218 associated with each of the plurality of factors 210. The data analyzer 140 may identify the first set of value intervals 222 from the factor range 218. The data analyzer 140 may implement the first cognitive learning operation 216 to deconstruct the factor range 218 for each of the plurality of factors 210 to identify a plurality of data partitions 220 based on the first set of value intervals 222. The plurality of data partitions 220 may refer to each of the segregated blocks of the target variable values associated with the target variable 212 such as the process runtime for the plurality of factors 210 from the preferential rank ordering. The data analyzer 140 may continue to split each data partition from the plurality of data partitions 220 until the terminal partition 226 may be determined. Subsequently, the data pruner 150 may identify a data pruning activator 228 to remove the plurality of data partitions 220 that do not add any significance to the plurality of data partitions 220 with respect to the resolution of the query 202. The data pruning activator 228 may identify the preponderant data partition 230 from the plurality of data partitions 220 relevant to processing the query 202 and neglect the remaining plurality of data partitions 220. The preponderant data partition 230 may include target variable values corresponding to a minimum process runtime. The data pruner 150 may identify the second set of value intervals 238 for classifying the target variable values present in the preponderant data partition 230. The data pruner 150 may implement the second cognitive learning operation 232 further segregate the preponderant data partition 230 into the plurality of clusters 234 based on the second set of value intervals 238. In an example, each of the plurality of clusters 234 may be including the target variable values from the preponderant data partition 230 associated with the target variable 212 such as the process runtime for the plurality of factors 210 from the preferential rank ordering. The data pruner 150 may identify the preponderant cluster 236 from the plurality of clusters 234 based on the second set of value intervals 238. The preponderant cluster 236 may include the breakeven point of the target variable 212 for a factor from the plurality of factors 210 based on the preferential rank ordering. The confidence predictor 160 may implement the third cognitive learning operation 242 to identify the confidence score 240 associated with the preponderant cluster 236 from the plurality of clusters 234. The system 110 may be configured such that higher the degree of correlation between a factor and the target variable 212 for example, the process runtime, higher the confidence score 240. The confidence predictor 160 may implement the third cognitive learning operation 242 to generate the process optimization result 244 based on the preponderant cluster 236 from the plurality of clusters 234 and the confidence score 240 associated with the preponderant cluster 236 (explained in detail by way of subsequent FIGs.). The process optimization result 244 including each of the plurality of processes 206 optimized to the resolution of the query 202. The system 110 may be configured so that the artificial intelligence component 208 may establish the plurality of data domains 214 and the preferential ranking order, first cognitive learning operation 216 may process the plurality of data domains 214 to determine the plurality of data partitions 220, the second cognitive learning operation 232 may process the plurality of data partitions 220 to determine the preponderant data partition 230. The second cognitive learning operation 232 may process the preponderant data partition 230 to determine the plurality of clusters 234 and identify the preponderant cluster 236 therefrom.

The SAR deployed by the system 110 may help in bringing together all the available information which gives a better scope and a bigger pool of data to understand and model the overall performance metric for the plurality of processes 206. The Varclus, Information value (IV) and Mean decrease Gini may give a three-tiered way of dimensionality reduction. Additionally, using a combination of these three approaches may facilitate in identifying the most significant factors from the plurality of factors 210 that may impact the performance. Additionally, multiple approaches may help in reducing the overlap effect of significant factors thereby, helping in better estimation of the significant factors. The system 110 may deploy the ensemble method, combining all base models to produce one optimal preferential order of the factors referred to as preferential ranking order. Additionally, the ensemble of the three models may help in asymptotic convergence of stochastic and sparse data. The non-linear models may behave robustly in case of out-of-range data. The system 110 may quantify the optimum breakeven points of significant factors using various machine learning models. The system may establish the net effect that the performance metric may have if the breakeven is achieved. Additionally, an associated confidence probability may also be produced for the breakeven of significant factors.

Accordingly, the system 110 may be used to arrive at the combination of server configuration state at which optimal performance in terms of process run-time may be achieved. The system 110 may assign a breakeven point or benchmark to each significant component such as each of the plurality of factors 210, which may impact the system performance and the associated gain or loss in performance metric, which may be the process run time. For example, the system 110 may infer that attaining a processor clock speed of greater than 3.6 Ghz, may allow the execution time to decrease by 12%, with a confidence probability of 78%. The system 110 may be configured such that the plurality of factors 210 from the process components may exhibit a high degree of correlation with process execution time. With such a rationale, the exemplary embodiments presented in this document hereinafter may use the target variable 212 as a mean process run time. The system 110 may be able to analyze transactions of the applications running and data to detect serious inefficiencies. Additionally, system performance analysis may help to identify resilience risks at critical integration points between components. In an example, the system performance metrics may be used to identify areas of improvement as well as monitor these efforts to ensure uninterrupted resiliency and enhanced performance quality.

Figure 3:
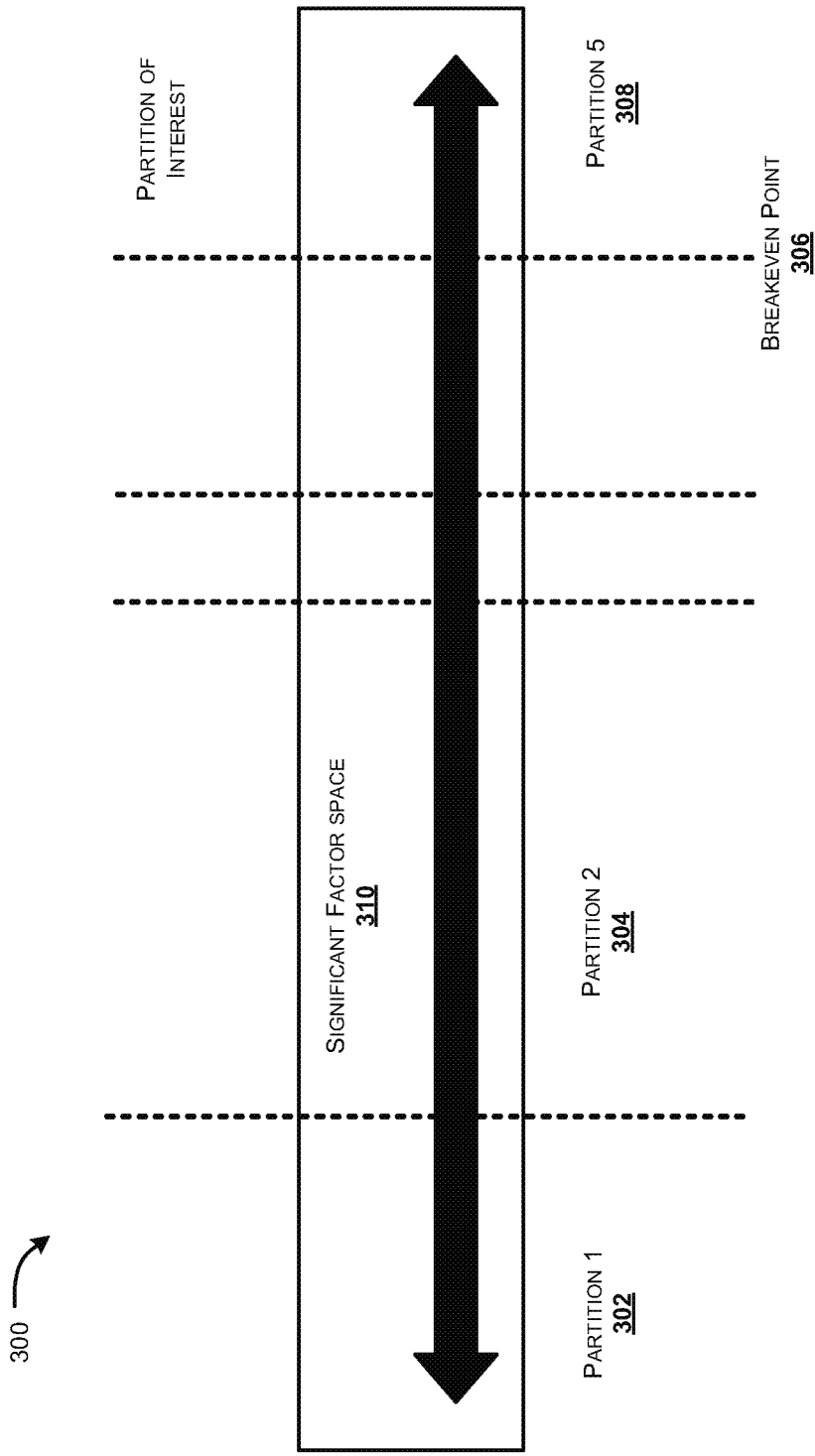
FIG. 3 illustrates a flow diagram for a plurality of data partitions as identified by a process optimization system, according to an example embodiment of the present disclosure.

FIG. 3 illustrates a flow diagram 300 for the plurality of data partitions 220 as identified by the process optimization system 110, according to an example embodiment of the present disclosure. The flow diagram 300 may deploy any of the components described through FIG. 1, and FIG. 2. The flow diagram 300 may include a significant factor space 310. The significant factor space 310 may be the factor range 218 as described above. The plurality of factors 210 identified by the preferential ranking order as more important may also be referred to as significant factors in this document. The system 110 may implement the first cognitive learning operation 216 to segment the significant factor space 310 into the plurality of data partitions 220 such as a data partition 1-302, a data partition 2-304, a partition 5-308. In an example, the system 110 may update the significant factor space 310 associated with each of the plurality of factors 210 based on an update in the process data 204. As mentioned above, the system 110 may be deployed to arrive at the breakeven points 306 for each of the plurality of factors 210 arranged in the preferential ranking order. Additionally, the breakeven point may be a particular value of a factor from the plurality of factors 210 for which the target variable 212 (here, process run time) may be both maximized as well as statistically stable. The system 110 may deploy the concept of Classification and Regression Trees (CART). The system 110 may use a regression tree to perform a partitioning on the significant factor space 310. The system 110 may focus on a particular partition such as the partition 5-308 which may be both statistically stable and may produce an optimized target variable 212. The partition 5-308 may be the preponderant data partition 230 as described above.

Figure 4:
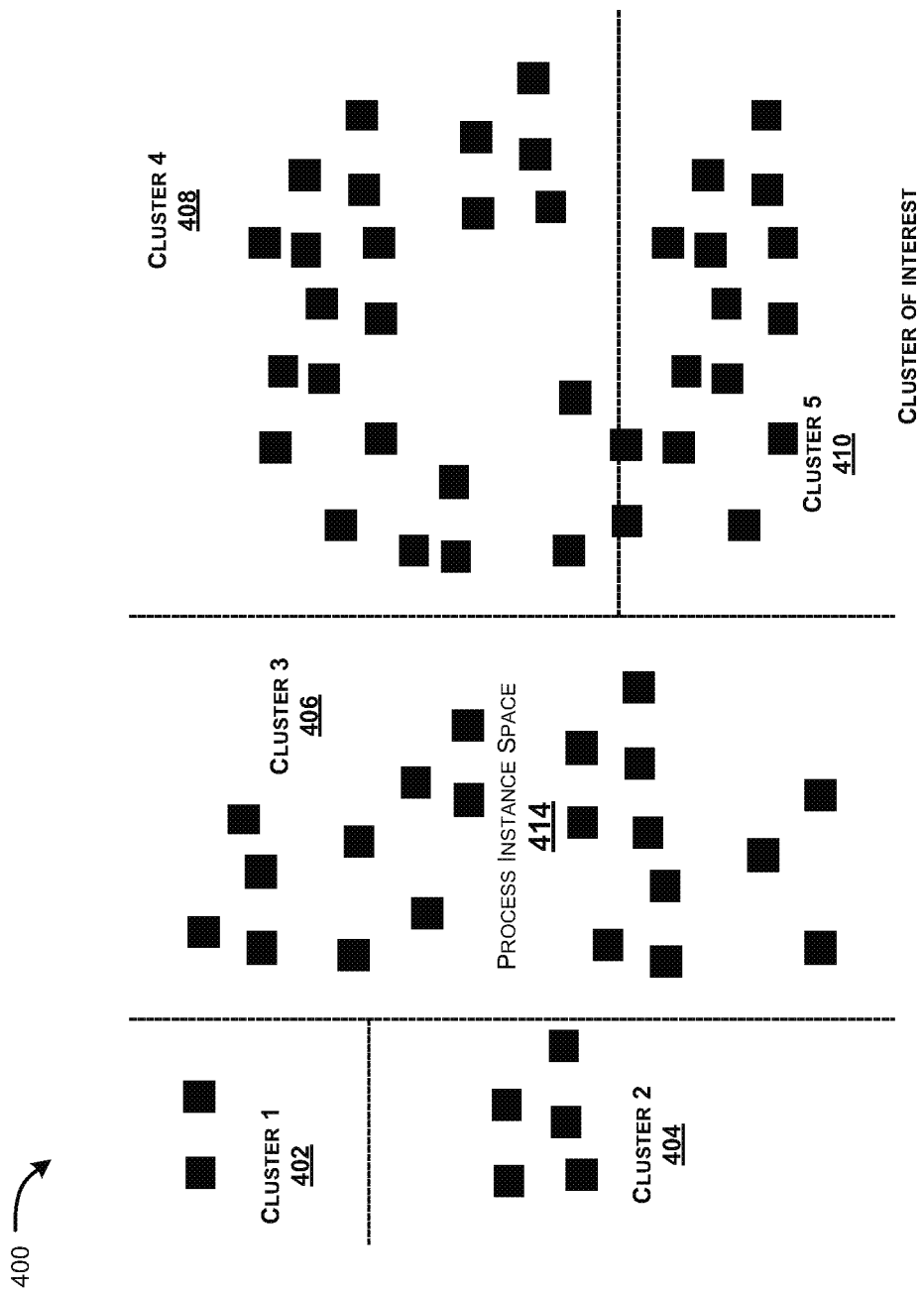
FIG. 4 illustrates a flow diagram of a plurality of clusters as identified by a process optimization system, according to an example embodiment of the present disclosure.

FIG. 4 illustrates a flow diagram 400 of the plurality of clusters 234 as identified by the process optimization system 110, according to an example embodiment of the present disclosure. The flow diagram 400 may deploy any of the components described through FIGS. 1-3. The flow diagram 400 may be derived from the flow diagram 300 using the partition 5-308, which may be the preponderant data partition 230. The partition 5-308 may be deconstructed into a process instance space 414 including a cluster 1-402, a cluster 2-404, a cluster 3-406, a cluster 4-408, and a cluster 5-410. The system 110 may implement the second cognitive operation on the partition 5-308 to create the plurality of clusters 234 including the cluster 1-402, the cluster 2-404, the cluster 3-406, the cluster 4-408, and the cluster 5-410. The system 110 may identify the second set of value intervals 238 as mentioned above. In an example, the system 110 may identify the cluster 5-410 as the preponderant cluster 236. The system 110 may be configured so that the artificial intelligence component 208 may establish the plurality of data domains 214 and the preferential ranking order, first cognitive learning operation 216 may process the plurality of data domains 214 to determine the plurality of data partitions 220, the second cognitive learning operation 232 may process the plurality of data partitions 220 to determine the preponderant data partition 230. The second cognitive learning operation 232 may process the preponderant data partition 230 to determine the plurality of clusters 234 and identify the preponderant cluster 236 therefrom. In the flow diagram 300, the preponderant data partition 230 may be the partition 5-308. In the flow diagram 400 the preponderant cluster 236 may be the cluster 5-410.

Figure 5:
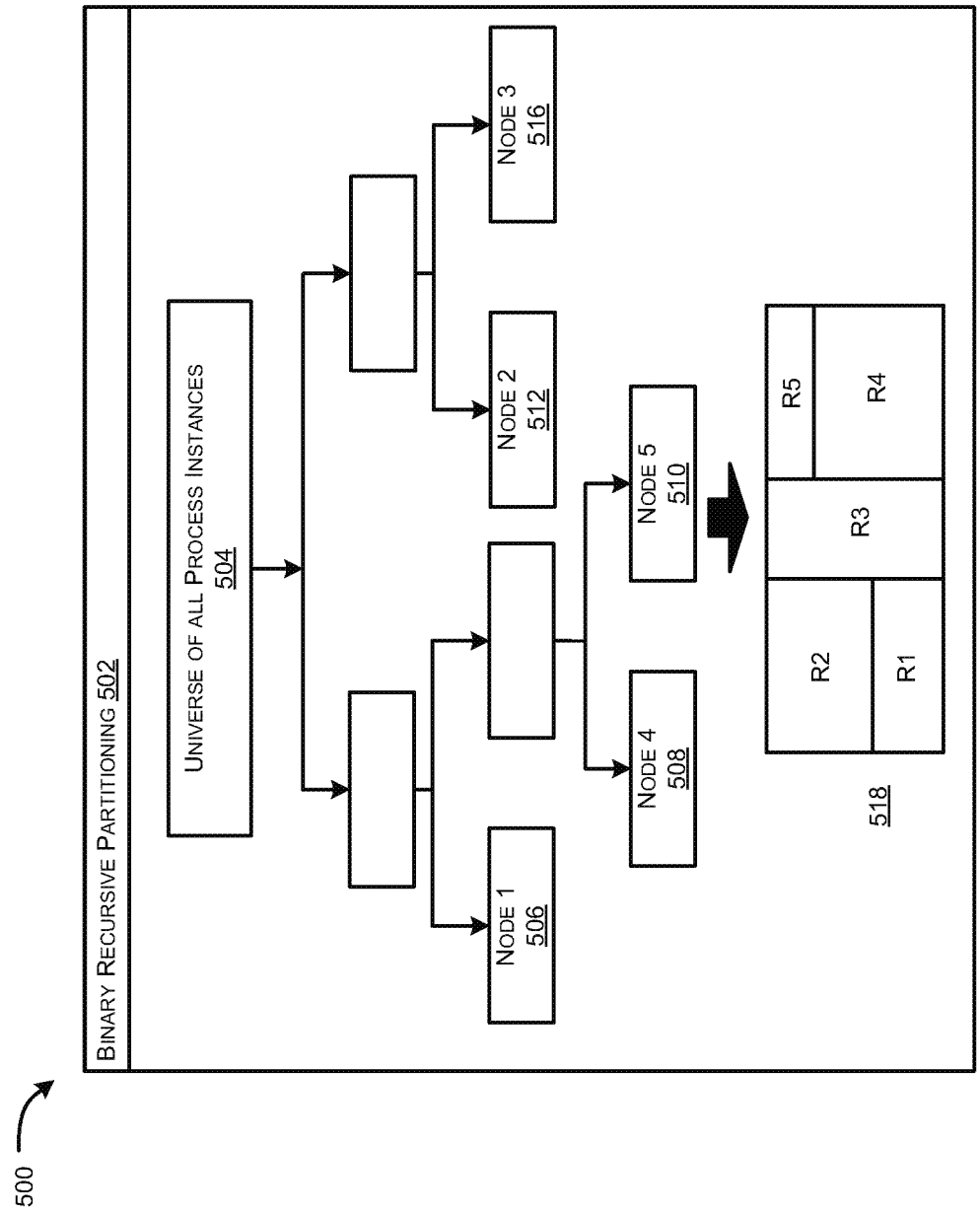
FIG. 5 illustrates a pictorial representation of a binary recursive partitioning for process optimization using a process optimization system, according to an example embodiment of the present disclosure.

FIG. 5 illustrates a pictorial representation 500 of a binary recursive partitioning 502 for process optimization using the process optimization system 110, according to an example embodiment of the present disclosure. The pictorial representation 500 may deploy any of the components described through FIGS. 1-4. The system 110 may construct a regression tree using a technique called binary recursive partitioning 502. This technique may essentially be an iterative process that may partition the space of the target variable 212 into splits or branches and then carry on partitioning each group into smaller sub-groups as the method moves up each branch. In the beginning, all instances in the Server Analytical Record (instances of process run times and their associated configurations and factors that may determine the structure of the tree may be grouped into the same partition. The methodology may then begin allocating the instances into the first two partitions or branches, using every possible binary split. It may then identify the split having a minimized sum of the squared deviations from the average of the two separate partitions. This iterative partitioning rule may then be applied to each of the new subdivisions or branches. The iterative exercise continues until a node is arrived at having a pre-defined minimum permissible size, thus becoming the terminal partition 226 as mentioned above. It must be noted that if the sum of squared deviations from the average in a partition may be zero even before arriving at a minimum size, it may be considered as the terminal partition 226. For example, in the pictorial representation 500, the binary recursive partitioning 502 may be illustrated. The binary recursive partitioning 502 may include a conglomerate of all process instances 504. The conglomerate of all process instances 504 may be derived from data harmonization and data normalization techniques as mentioned by way of FIG. 2. The binary recursive partitioning 502 may segregate the conglomerate of all process instances 504 into a node 1-506, a node 2-512, a node 3-516, a node 4-508, and a node 5-510. In accordance with various embodiments of the present disclosure, the node 1-506, the node 2-512, the node 3-516, the node 4-508, and the node 5-510 may be the plurality of data partitions 220 as mentioned above. In an example, the node 1-506 may be the data partition 1-302 (of FIG. 3), the node 2-512 may be the data partition 2-304, and, the node 5-510 may be the data partition 5-308. Subsequently, the node 5-510 may be the preponderant data partition 230 similar to the data partition 5-308.

The binary recursive partitioning 502 may further include the identification of a cluster conglomerate 518. In an example, the duster conglomerate 518 may be the plurality of clusters 234 derived from the preponderant data partition 230 as described above. In an example, the cluster conglomerate 518 may include the cluster 1-402, the cluster 2-404, the cluster 3-406, the cluster 4-408, and the cluster 5-410. The binary recursive partitioning 502 may be deployed by the system 110 to determine the plurality of data partitions 220, the preponderant data partition 230, the plurality of clusters 234, the preponderant cluster 236, the first set of value intervals 222, and the second set of value intervals 238.

Figure 6:
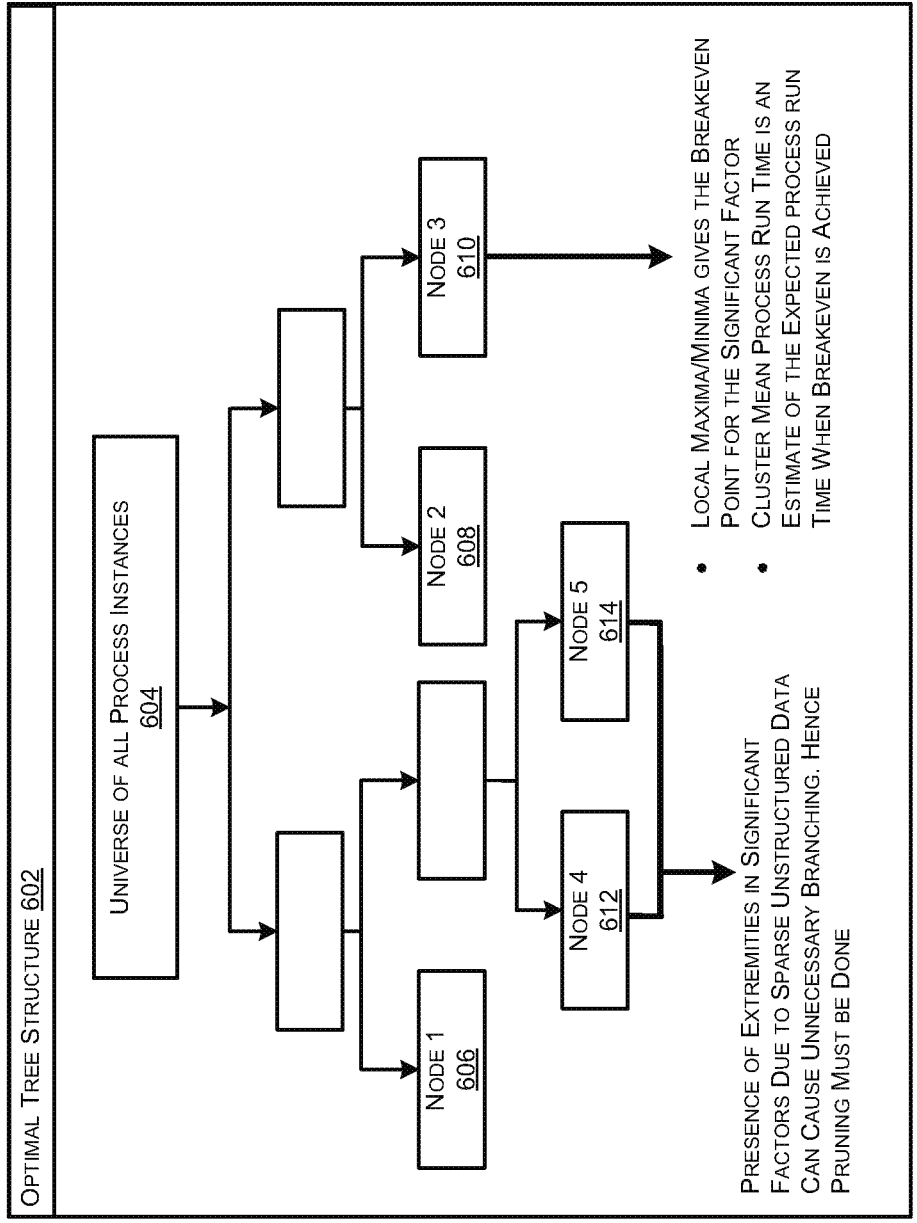
FIG. 6 illustrates a pictorial representation for creating a tree structure for process optimization using a process optimization system, for process optimization according to an example embodiment of the present disclosure.

FIG. 6 illustrates a pictorial representation 600 of creating a tree structure for process optimization using the process optimization system 110, for process optimization according to an example embodiment of the present disclosure. The pictorial representation 600 may deploy any of the components described through FIGS. 1-5. In an example, the system 110 may illustrate results from the binary recursive partitioning 502 in the form of a tree structure 602. The tree structure 602 may be optimized to provide the break-even points for a factor from the plurality of factors 210. The binary recursive partitioning 502 may lead to specific cuts in the significant factor space 310 of the significant plurality of factors 210. The system 110 may deploy the aforementioned cuts to determine nodes or clusters of instances of processes from the server analytical record. In the pictorial representation 600, the nodes may be a node 1-606, a node 2-608, a node 3-610, a node 4-612, and a node 5-614. The system 110 may for example, determine an average of the target variable 212 such as average process run time for the instances in a particular node for each of the node 1-606, the node 2-608, the node 3-610, the node 4-612, and the node 5-614, in order to obtain an ordering for the nodes based on the target variable 212 mean. As mentioned above, the system 110 may determine the first set of value intervals 222 based on a minimum target variable value and a maximum target variable value. The system 110 may obtain groups of historical processes with an average process run time in increasing order. The system 110 may be configured so that the cluster having the minimum average process, for example, the node 3-610, may be processed for the run time and the associated local maxima/minima of the associated significant factor variable may lead to the breakeven point above/below which an optimal and statistically stable process run time may be obtained. Also, for this particular exemplary node 3-610, the mean process run time may reflect the probable (explained later in the document) process run time which may be attained if the breakeven point may be achieved for the significant factor. Additionally, the node 4-612, and the node 5-614 for example, may include extremities that may be present due to sparse unstructured data. Such data may cause unnecessary branching of the tree structure 602, thereby making the data pruning process imperative for the system 110. As mentioned above, system 110 may identify the preponderant data partition 230 relevant to processing the query 202 and neglect the remaining plurality of data partitions 220. In the tree structure 602, the system 110 may identify the node 3-610 as the preponderant data partition 230 and neglect the node 4-612, and the node 5-614.

Figure 7:
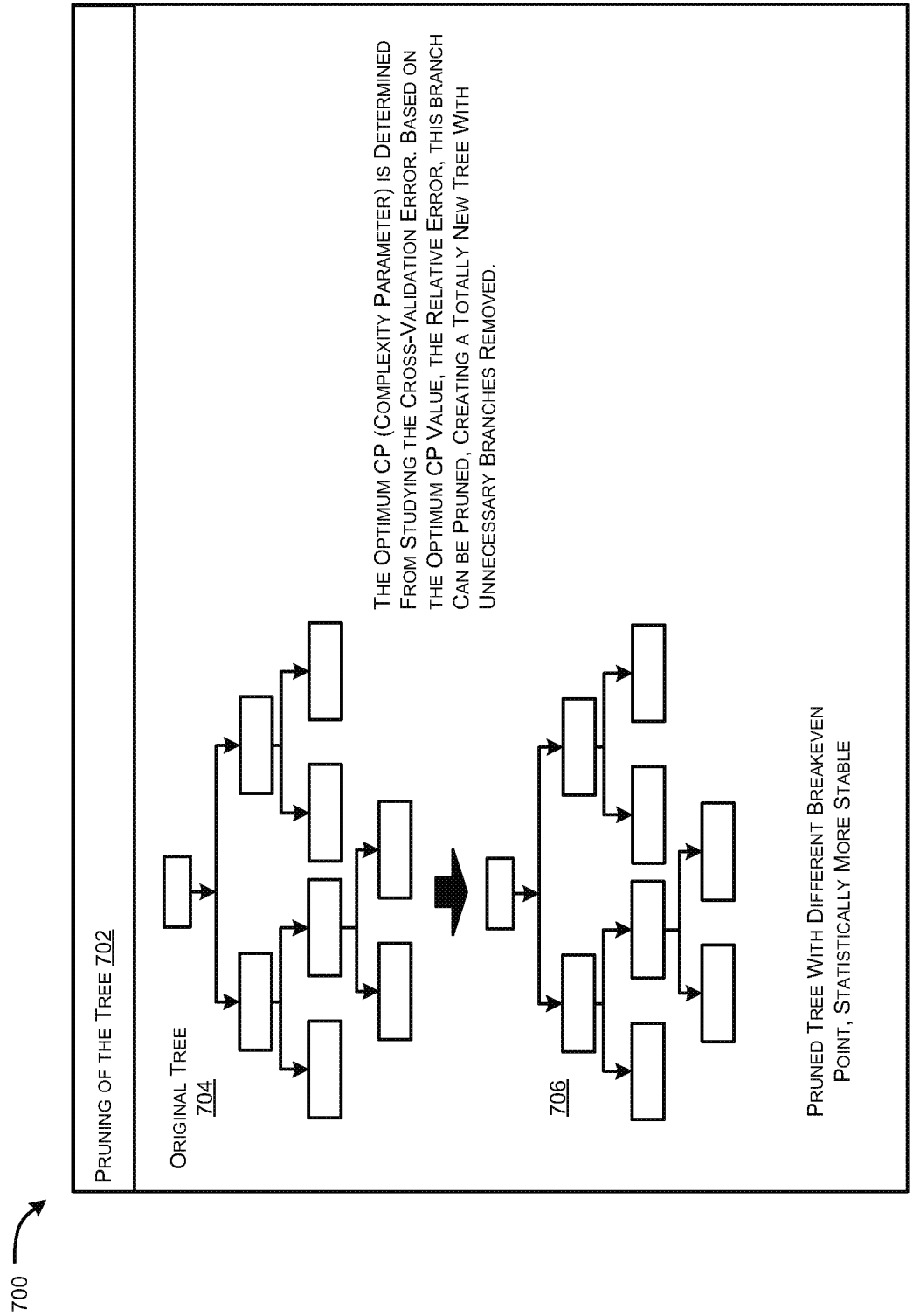
FIG. 7 illustrates a pictorial representation of a pruning process for a tree structure as deployed by the process optimization system, according to an example embodiment of the present disclosure.

FIG. 7 illustrates a pictorial representation 700 of a pruning process 702 for a tree structure 704 as deployed by the process optimization system 110, according to an example embodiment of the present disclosure. The pictorial representation 700 may deploy any of the components described through FIGS. 1-6. As mentioned above, the tree structure 704 may be constructed based on the historical data for the plurality of processes 206. The constructed tree structure 704 may be similar to the tree structure 602. The system 110 may implement the artificial intelligence component 208, and the first cognitive learning component for deploying various regression models for performing a base and scale transformation on the target variable values. However, data instances from Server Analytical Record may become too deep and the tree structure 602 may become more complex with a lot of nodes. This may be because of insignificant variation that might cause branching which is not as meaningful. Also, there may be some cases where the presence of outlier data may cause unnecessary branching such as for example, the node 4-612, and the node 5-614. To minimize these occurrences and also to prevent mapping of extreme values impacting variances in such a way that impacts the fit as a whole, the system 110 may prune the constructed tree structure 704 into a pruned tree structure 706.

The pruning process 702 may be an important step for process optimization because the sparse, unstructured nature of the data can throw extreme values which may cause the constructed tree structure 704 to form unnecessary splits leading to overfitting. Overfitting of extremities into the constructed tree structure 704 may be a serious issue as it may result in creating meaningless partitions that add little or no value in terms of explaining power to the resultant tree and may affect breakeven points in the process to be optimized for a resolution of the query 202. The process of trimming the extremely deep branches of the constructed tree may be known as pruning. The system 110 may deploy a metric called a Complexity Parameter (CP). The CP may be a pre-defined small quantity which may be the minimum improvement in variability explanation needed at each node. The rationale may be that if a node such as any of the node 1-606, the node 2-608, the node 3-610, the node 4-612, and the node 5-614, after branching, may produce no additional benefit, then they may be removed from the constructed tree structure 704. In mathematical terms, the complexity parameter may be the amount by which splitting a node may improve a relative error. For example, the relative error may be 0.5 at a node from any of the node 1-606, the node 2-608, the node 3-610, the node 4-612, and the node 5-614. Now on splitting, if the sub-nodes may have a relative error of 0.48, then there may not be many benefits in creating the split. If it was for example, 0.1, then it would have been prudent to keep the split. The system 110 may choose the optimum complexity parameter, by the cross-validation of error. The error may be arising out of cross-validation exercises where a portion of the data may be used to build the tree and the remaining to test its fit. For every division, logically it may be expected that the cross-validation error may reduce, but if the fitted constructed tree structure 704 may have the problems of overfitting due to extreme values of the significant factors, the cross-validation error may increase or might exhibit minimal improvement. In such a scenario, for pruning, the system 110 may re-construct the constructed tree structure 704 having some modified complexity parameter or prune the existing constructed tree structure 704 by using the old tree with a different CP value. In an example, the pruned tree 706 may be a new constructed tree structure 704 with unnecessary branches removed.

Figure 8:
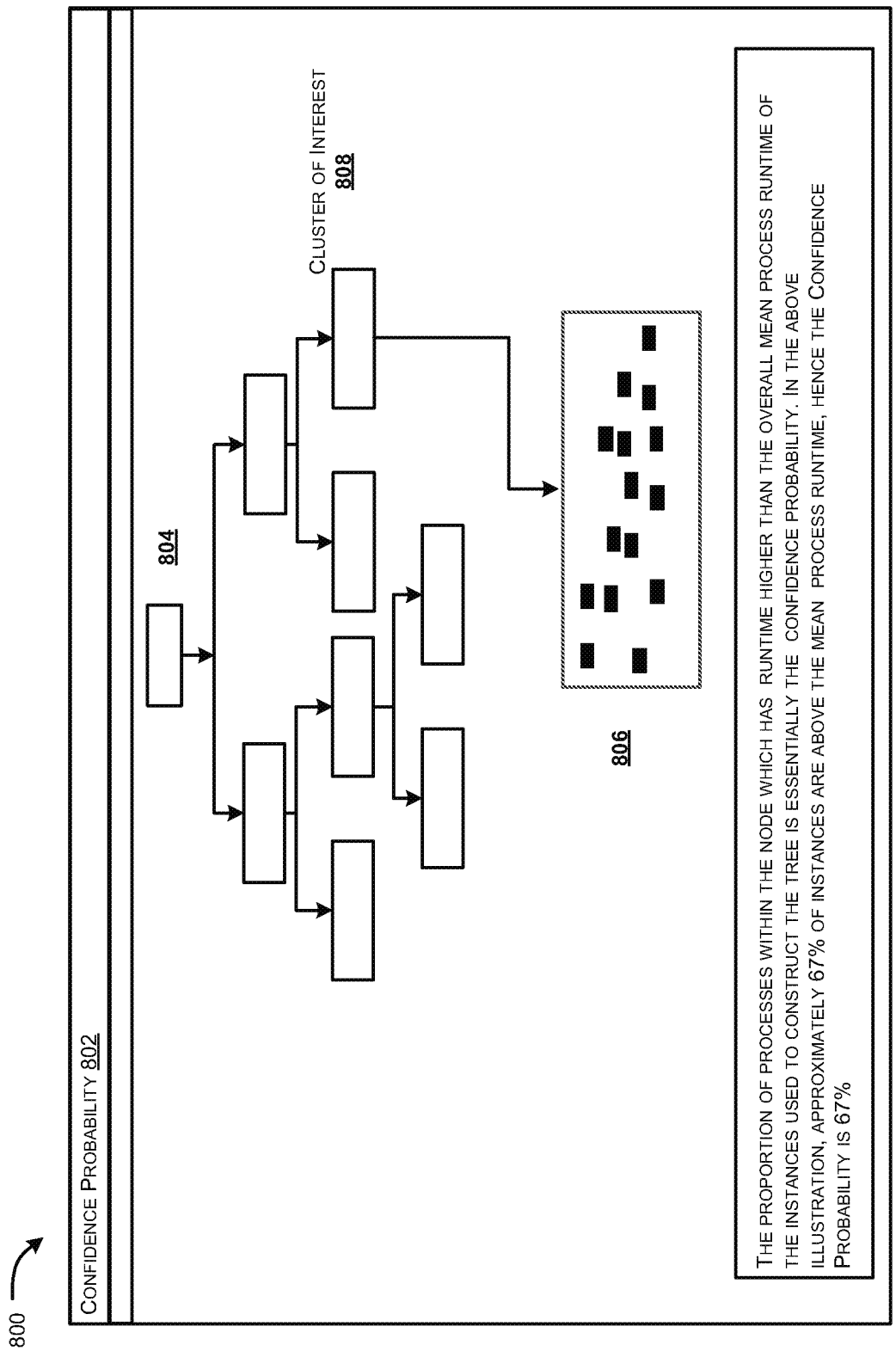
FIG. 8 illustrates a pictorial representation of a confidence probability prediction by deploying a process optimization system, according to an example embodiment of the present disclosure.

FIG. 8 illustrates a pictorial representation 800 of a confidence probability prediction 802 by deploying the process optimization system 110, according to an example embodiment of the present disclosure. The pictorial representation 800 may deploy any of the components described through FIGS. 1-7. The system 110 may estimate the confidence probability associated with the corresponding breakeven point of the significant factor. The system 110, while partitioning a set historical process instances 804 as described above, may focus on one of the nodes such as the significant node 808 for the breakeven point. The significant node 808 may have a collection of historical process instances 806 having their corresponding target variable 212 such as process run times as mentioned above. It may not be necessary that all of these process instances 806 may have an equal process run times. The system 110 may estimate a proportion of processes within the significant node 808 which may have a run time higher than the mean process run time of the instances used to construct the tree. This number may essentially be the confidence probability. For example, if for a particular significant factor, the confidence probability may be "xx %", it may convey the fact that on an average, if the significant factor may be fine-tuned up to the estimated breakeven point, then the process run time may be improved to the nodal mean with a probability of "xx %". The higher the degree of correlation between the significant factor and the target variable 212 such as the process runtime, the higher the confidence probability. For example, in the pictorial representation 800, approximately 67% of instances may be above the mean process run time, hence the confidence probability may be 67%. The confidence probability may be the confidence score 240. The historical process instances 806 may be the preponderant cluster 236. The significant node 808 may be the preponderant data partition 230.

FIGS. 9-14 illustrate a use case example of the system 110, and it should be treated as such. It should be clear to a person skilled in the art that the system 110 may perform the process optimization and break-even calculation for many types of data sets with the plurality of factors 210 and the target variable 212 being dependent on the plurality of processes 206, and the organization deploying the system 110.

Figure 9:
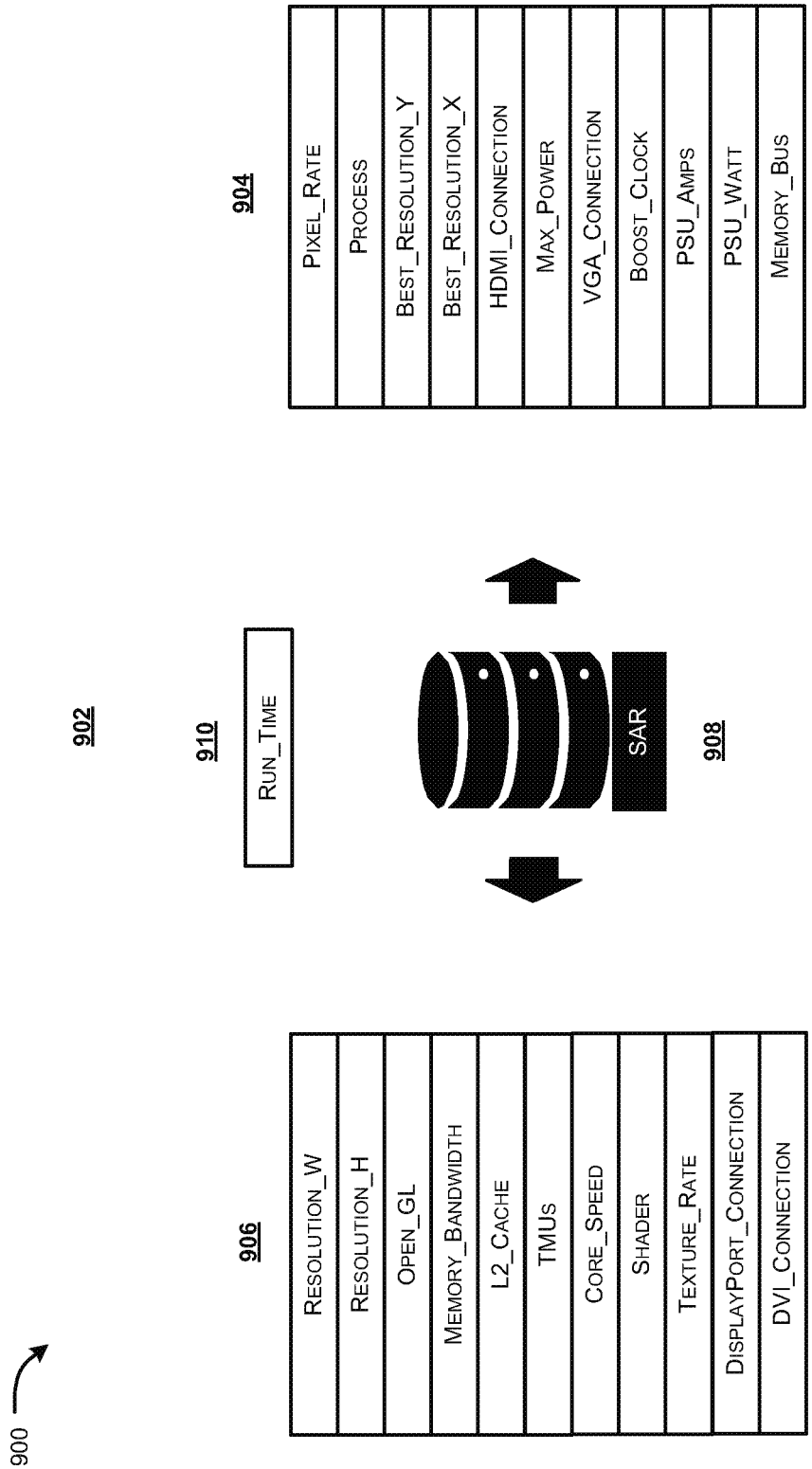
FIG. 9 illustrates a pictorial representation of a data harmonization process for process optimization by deploying a process optimization system, according to an example embodiment of the present disclosure.

FIG. 9 illustrates a pictorial representation 900 of a data harmonization process 902 (also referred to as the process 902 hereinafter) for process optimization by deploying the process optimization system 110, according to an example embodiment of the present disclosure. The pictorial representation 900 may deploy any of the components described through FIGS. 1-8. The process 902 may derive breakeven points for the significant factors that may impact run time, and in turn, achieve optimal performance. The data used here is rolled up at a process level for this process 902 and may contain several factors that may impact the performance metric. The process 902 may include the target variable 212 to be a process runtime 910. The process 902 may further include a factor set 906 and a factor set 904. The process 902 may include using SAR 908 for processing the factor set 906 and the factor set 904. The SAR 908 may be the server analytics record described above by way of FIG. 2. The factor set 906 may include various factors such as for example, Resolution_W, Resolution_H, Open_GL, Memory_Bandwidth, L2_Cache, TMUs, Core_Speed, Shader, Texture_Rate, and DVI_Connection. The factor set 904 may include various factors such as for example, Pixel_Rate, Process, Best_Resolution_Y, Best_Resolution_X, HDMI_Connection, Max_Power, VGA_Connection, Boost_Clock, PSU_Amps, PSU_Watt, and Memory_Bus. For the sake of brevity, and technical clarity the above mentioned may not be explained in detail herein, however, it should be clear to a person skilled in the art. The data present in the factor set 906, and the factor set 904 may consist of various configuration factors corresponding to the states when the processes were run in an organization. The system 110 may be derived from the preferential ranking order to identify the significant factors from the factor set 904, and the factor set 906. For the most significant factors, the system 110 may obtain the breakeven points. The data harmonization process 902 may be a first process implemented by the system 110 to calculate the breakeven points for most significant factors derived from the list mentioned above with the target variable 212 being process runtime 910.

Figure 10:
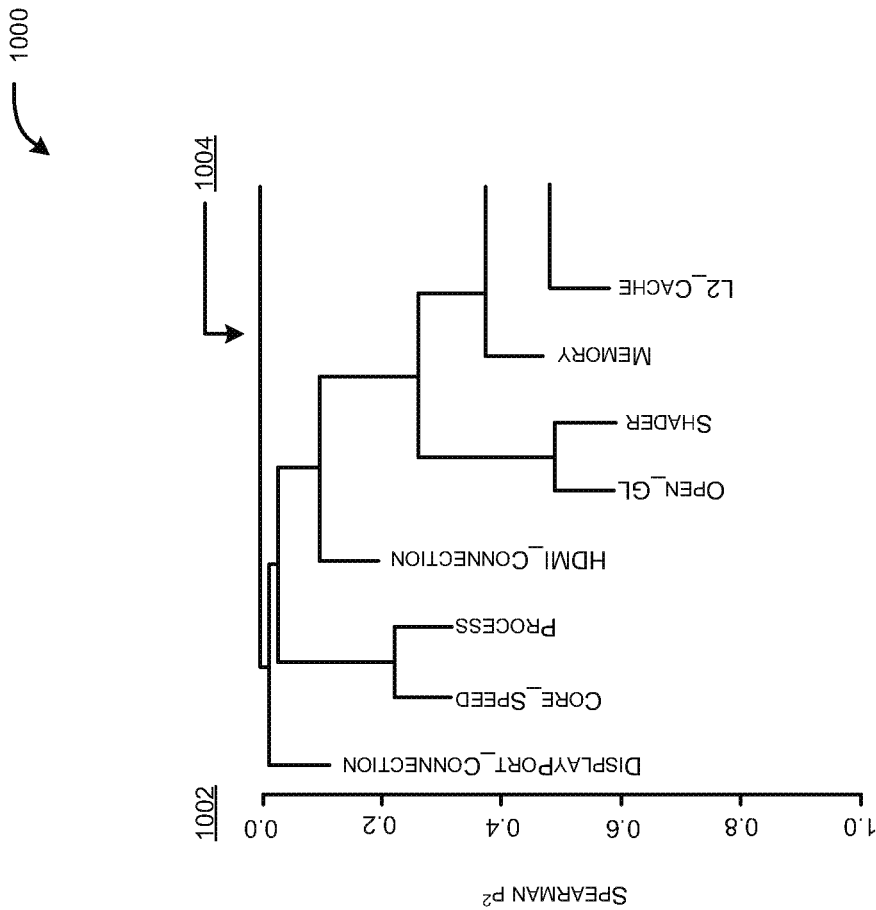
FIG. 10 illustrates a pictorial representation of a variable selection process for process optimization by deploying a process optimization system, according to an example embodiment of the present disclosure.

FIG. 10 illustrates a pictorial representation 1000 of a variable selection process 1002 (also referred to as the process 1002 hereinafter) for process optimization by deploying the process optimization system 110, according to an example embodiment of the present disclosure. The pictorial representation 1000 may deploy any of the components described through FIGS. 1-9. In an example, the system 110 may map the plurality of factors 210 with the target variable 212 to calculate the correlation between them. Specifically, higher the rank higher would the impact of the factor on the process. The pictorial representation 1000 illustrates a table 1006, wherein factors from the factor set 906, and the factor set 904 may be processed using various regression models. The table 1006 includes a rank for each of the factors mentioned in the factor set 906, and the factor set 904. The table 1006 illustrated in the pictorial representation 1000 may be presented herein.

| Factor | Correlation |
| --- | --- |
| Resolution_W | 0.70 |
| Resolution_H | 0.67 |
| Open_GL | 0.59 |
| Memory_Bandwidth | 0.58 |
| L2_Cache | 0.54 |
| Memory | 0.54 |
| Core_Speed | 0.53 |
| Shader | 0.49 |

-continued

| Factor | Correlation |
| --- | --- |
| Texture_Rate | 0.48 |
| TMUs | 0.47 |
| Pixel_Rate | 0.47 |
| Process | −0.46 |
| Best_Resolution_Y | 0.43 |
| Best_Resolution_X | 0.41 |
| HDMI_Connection | 0.39 |
| Max_Power | 0.37 |
| VGA_Connection | −0.34 |
| Boost_Clock | 0.28 |
| PSU_Amps | 0.26 |
| DisplayPort_Connection | −0.19 |
| DVI_Connection | 0.17 |
| PSU_Watt | 0.14 |
| Memory_Bus | 0.07 |

In an example, the system 110 may implement a two-step variable selection procedure to derive a list of significant factors that might affect the process runtime 910. The system 110 may determine a correlation of each factor mentioned in the factor set 904, and the factor set 906 against the target variable 212 such as the process runtime 910 and then perform a Varclus procedure (explained by way of FIG. 2). The results from the correlation ranking may be presented by the table 1006, and the results from the Varclus procedure may be illustrated by a chart 1004. The correlation measure may determine factors from the factor set 904, and the factor set 906, which may have high explanatory power while the Varclus plot may suggest removal of those variables which may exhibit multicollinearity and may have no added value. The system 110 may exclude the factors from the table 1006 that may have an absolute value below for example, 0.25, thereby excluding DisplayPort_Connection, DVI_Connection, Memory_Bus, and PSU_watt from the preferential ranking order. The system 110 may deploy the Varclus procedure and create the chart 1004. The system 110 may exclude all branches below the dotted line at 0.8 as illustrated and therefore, factors like Resolution_H, TMUs and Best_Resolution_X may be excluded from the preferential ranking order. The process 1002 may provide the list of significant factors that may be deployed by the system 110 for a generation of the preferential ranking order and resolution of the query 202.

Figure 12:
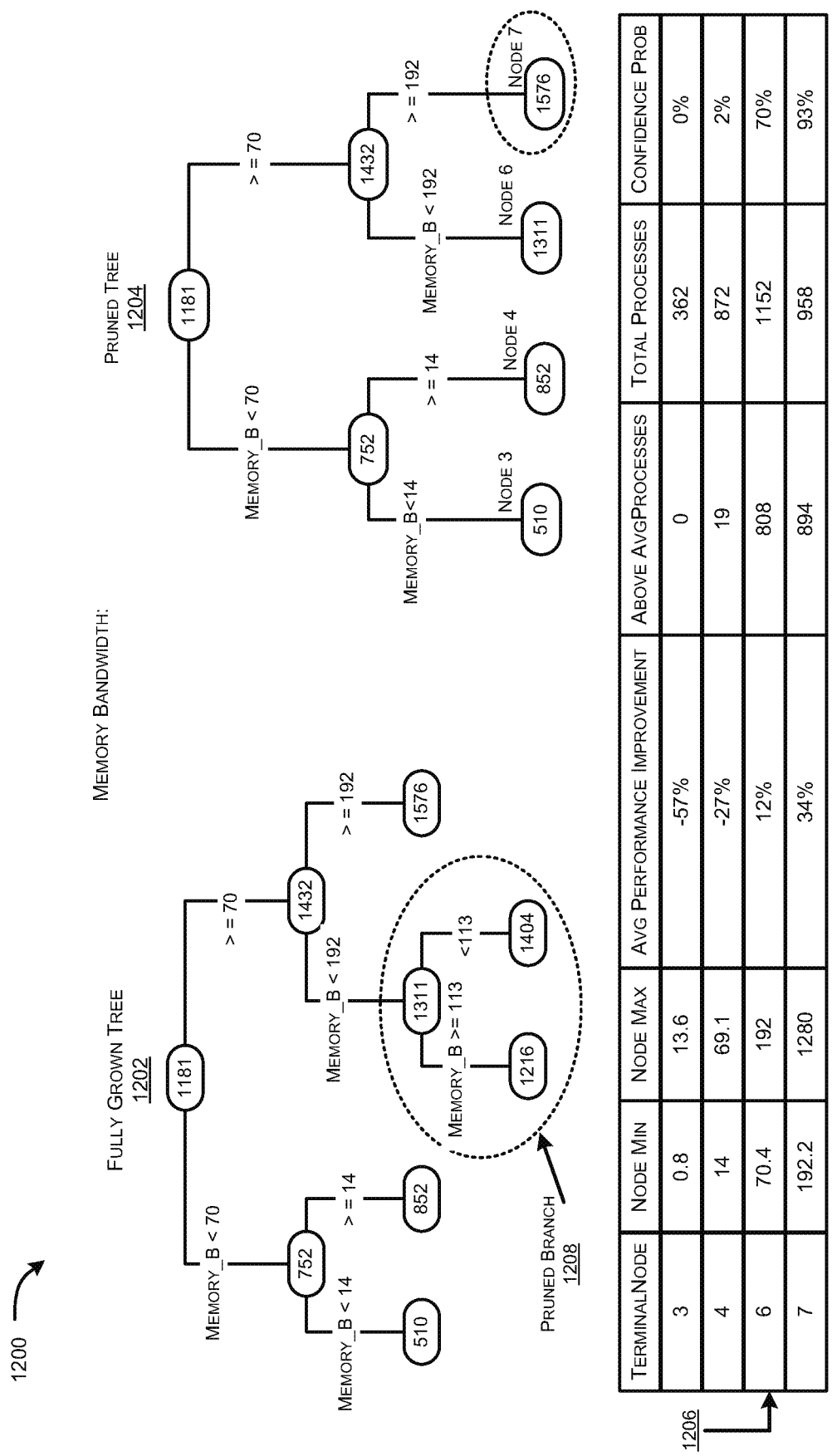
FIG. 12 illustrates a pictorial representation of a tree construction and pruning process using memory bandwidth as a factor for process optimization by deploying a process optimization system, according to an example embodiment of the present disclosure.
Figure 13:
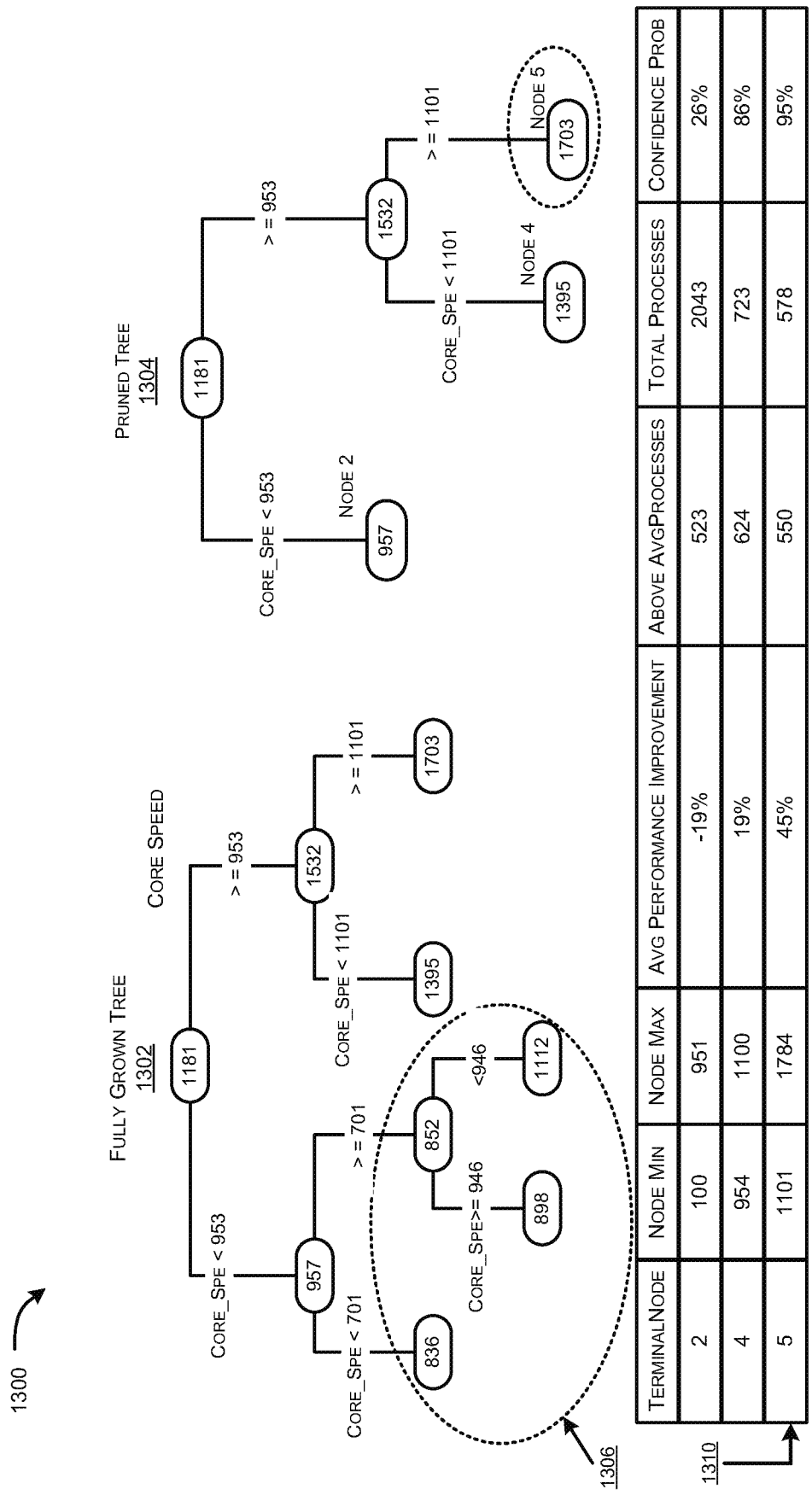
FIG. 13 illustrates a pictorial representation of a tree construction and pruning process using core speed as a factor for process optimization by deploying a process optimization system, according to an example embodiment of the present disclosure.

FIG. 11 illustrates a pictorial representation 1100 of a regression modeling process 1102 for process optimization by deploying the process optimization system 110, according to an example embodiment of the present disclosure. The pictorial representation 1100 may deploy any of the components described through FIGS. 1-10. The results from the process 1002 may be deployed by the system 110 for nonlinear regression modeling. Also, as mentioned above, the plurality of factors 210 may be ranked based on the combined significance levels from each of the regression models (few examples mentioned above by way of FIG. 2), reflecting their importance on affecting the target variable 212 such as process runtime 910. As illustrated in the pictorial representation 1100, the system 110 may determine the preferential rank ordering among the factors based on the regression output. The system may leave out the ones that have less p-value as illustrated by the pictorial representation 1100. Further, based on the p-value and absolute value of standardized beta estimates, the system 110 may exclude shader, Memory, PSU_Amps, Max_Power and Boost_Clock and proceed with the remaining factors from the factor set 904, and the factor set 906 for breakeven point calculation. The system 110 may determine that the factors such as shader, Memory, PSU_Amps, Max_Power and Boost_Clock may not have significant explanatory power for the variation exhibited by the target variable 212. As illustrated from the pictorial representation 1100, factors such as "Memory Bandwidth", and "Core Speed" may be leading factors that may have an impact on the target variable 212 such as the process runtime 910. FIGS. 12-13 provide breakeven analysis use case examples for "Memory Bandwidth", and "Core Speed" factors respectively.

FIG. 12 illustrates a pictorial representation 1200 of a tree construction and pruning process using memory bandwidth as a factor for process optimization by deploying the process optimization system, according to an example embodiment of the present disclosure. The pictorial representation 1200 may deploy any of the components described through FIGS. 1-11. The pictorial representation 1200 may illustrate a fully-grown tree 1202, and a pruned tree 1204. The fully-grown tree 1202 may be pruned to determine the pruned tree 1204. As mentioned above, the pruning process may be required due to the presence of extremities in significant factors due to sparse, unstructured data that may have caused unnecessary branching. Also, as mentioned above, a maxima/minima may give the breakeven point for the significant factor. Additionally, a cluster mean process run time may be an estimate of the expected process run time when breakeven may be achieved. The pruning process may include constructing the fully-grown tree 1202 based on the optimal CP value as mentioned above. The fully-grown tree 1202 may include a value set "1311" as illustrated. The value set "1311" may be further partitioned to provide a value "1216", and a value "1404". The system 110 may determine that the value "1216", and the value "1404" may not be adding significance to the process of breakeven calculation. The fully-grown tree 1202 may be pruned, thereby removing the value "1216", and the value "1404" from the fully-grown tree 1202 as a pruned branch 1208. The pruned tree 1204 may be constructed by removing the pruned branch 1208 as illustrated. The pruned tree 1204 may include a node 3, a node 4, a node 6, and a node 7 as plurality of data partitions 220, out of which node 7 is the terminal partition 226, as shown in FIG. 2. The system 110 may examine the node 1, the node 2, the node 3, and the node 4 for breakeven calculation. The analysis of the node 1, the node 2, the node 3, and the node 4 may be illustrated by a table 1206. The table 1206 may stipulate that if the "Memory Bandwidth" is at least 192.2, then an expected improvement in performance may be 34% observed with a confidence probability of 93%. Therefore, the system may determine 192.2 as a breakeven point for the factor "memory bandwidth".

FIG. 13 illustrates a pictorial representation 1300 of a tree construction and pruning process using "core speed" as a factor for process optimization by deploying the process optimization system 110, according to an example embodiment of the present disclosure. The pictorial representation 1300 may deploy any of the components described through FIGS. 1-12. The pictorial representation 1300 may illustrate a fully-grown tree 1302, and a pruned tree 1304. The fully-grown tree 1302 may be pruned to determine the pruned tree 1304. As mentioned above, the pruning process may be required due to the presence of extremities in significant factors due to sparse, unstructured data that may have caused unnecessary branching. Also, as mentioned above, a maxima/minima may give the breakeven point for the significant factor. Additionally, a cluster mean process run time may be an estimate of the expected process run time when breakeven may be achieved. The pruning process may include constructing the fully-grown tree 1302 based on the optimal CP value as mentioned above. The fully-grown tree 1302 may include a value set "957" as illustrated. The value set "957" may be further partitioned to provide a value "836", and a value "991". The value "991" may be further partitioned to provide a value "898", and "1112". The system 110 may determine that the value "836", the value "991", the value "898", and the value "1112" may not be adding significance to the process of breakeven calculation. The fully-grown tree 1302 may be pruned, thereby removing the value "836", the value "991", the value "898", and the value "1112" from the fully-grown tree 1302 as a pruned branch 1306. The pruned tree 1304 may include a node 2, a node 4, and a node 5 as plurality of data partitions 220, out of which node 5 is the terminal partition 226. The system 110 may examine the node 2, the node 4, and the node 5 for breakeven calculation. The analysis of the node 2, the node 4, and the node 5 may be illustrated by a table 1310. The table 1310 may stipulate that if the "Core Speed" may be at least 1101, then an expected improvement in performance may be 45% observed with a confidence probability of 95%. Therefore, the system may determine 1101 as a breakeven point for the factor "Core Speed". Similarly, the system 110 may determine breakeven points for all factors determined from the process 1102.

Figure 14:
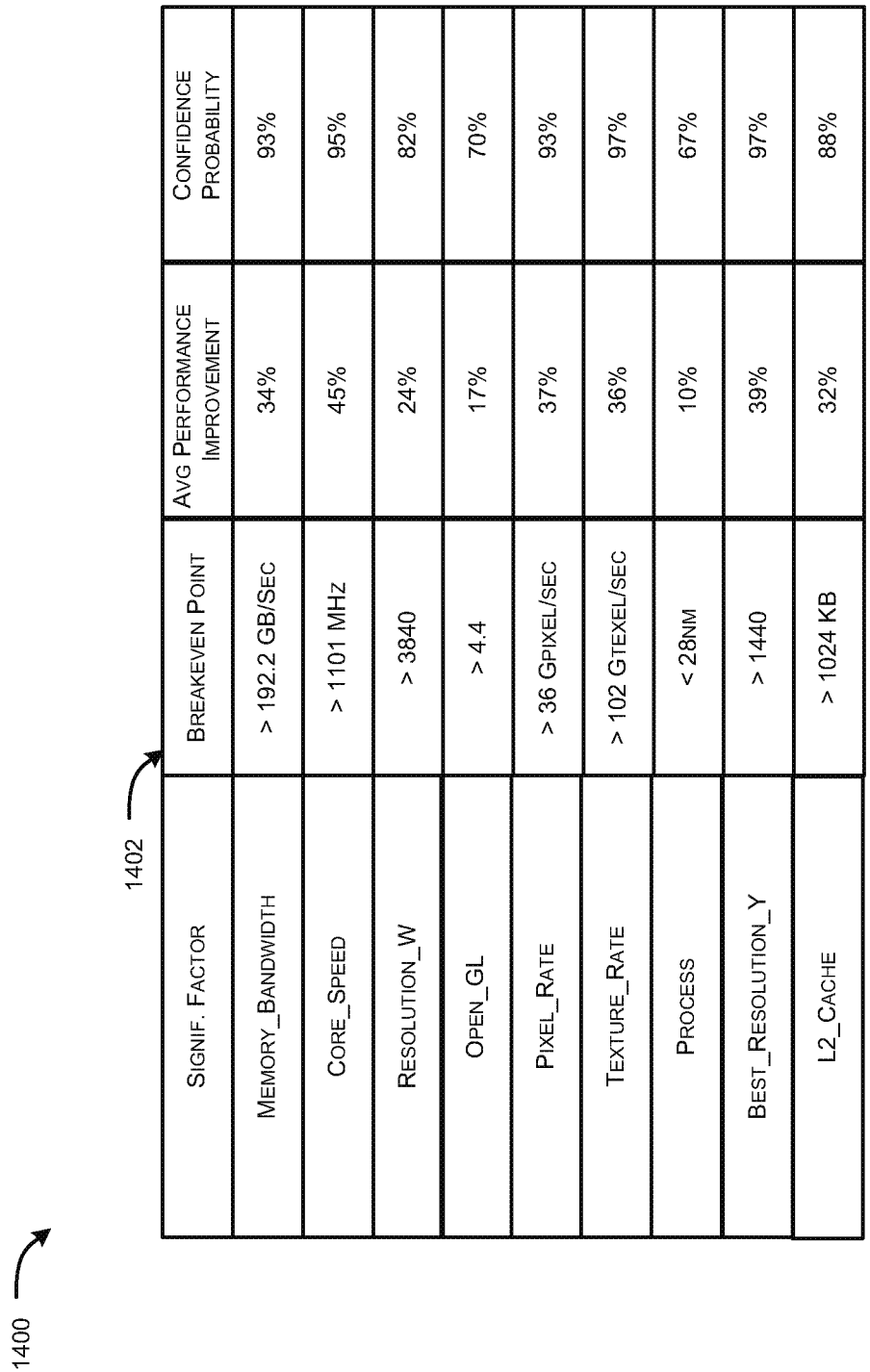
FIG. 14 illustrates a pictorial representation of a process optimization result by deploying a process optimization system, according to an example embodiment of the present disclosure.

FIG. 14 illustrates a pictorial representation 1400 of a process optimization result 244 by deploying the process optimization system 110, according to an example embodiment of the present disclosure. The pictorial representation 1400 may deploy any of the components described through FIGS. 1-13. As mentioned above, the system 110 may determine breakeven points for all factors determined from the process 1102. The pictorial representation 1400 may illustrate a table 1402. The table 1402 lists a breakeven point, an average performance improvement and a confidence probability for various factors determined by the process 1102 for optimal performance of process under consideration by the system 110 as part of the query 202. For example, the Memory Bandwidth of more than 192.2 GB/sec will have an expected improvement on the performance of 34% with a confidence probability of 93% (as illustrated by FIG. 12). The Core Speed of more than 1101 MHz will have an expected improvement on the performance of 45% with a confidence probability of 95% (as illustrated by FIG. 13). A "Resolution Width" of more than 3840 will have an expected improvement on the performance of 24% with a confidence probability of 82%. An "Open_GL" more than 4.4 will have an expected improvement on the performance of 17% with a confidence probability of 70%. A "Pixel Rate" more than 36 Gpixel/sec will have an expected improvement on the performance of 37% with a confidence probability of 93%. A "Texture Rate" more than 102 Gtexel/sec will have an expected improvement on the performance of 36% with a confidence probability of 97%. A "Process" below 28 nm will have an expected improvement on the performance of 10% with a confidence probability of 67%. A "Y Resolution" of more than 1440 will have an expected improvement on the performance of 39% with a confidence probability of 97%. An "L2 Cache" mode than 1024 KB will have an expected improvement on the performance of 32% with a confidence probability of 88%.

Figure 15:
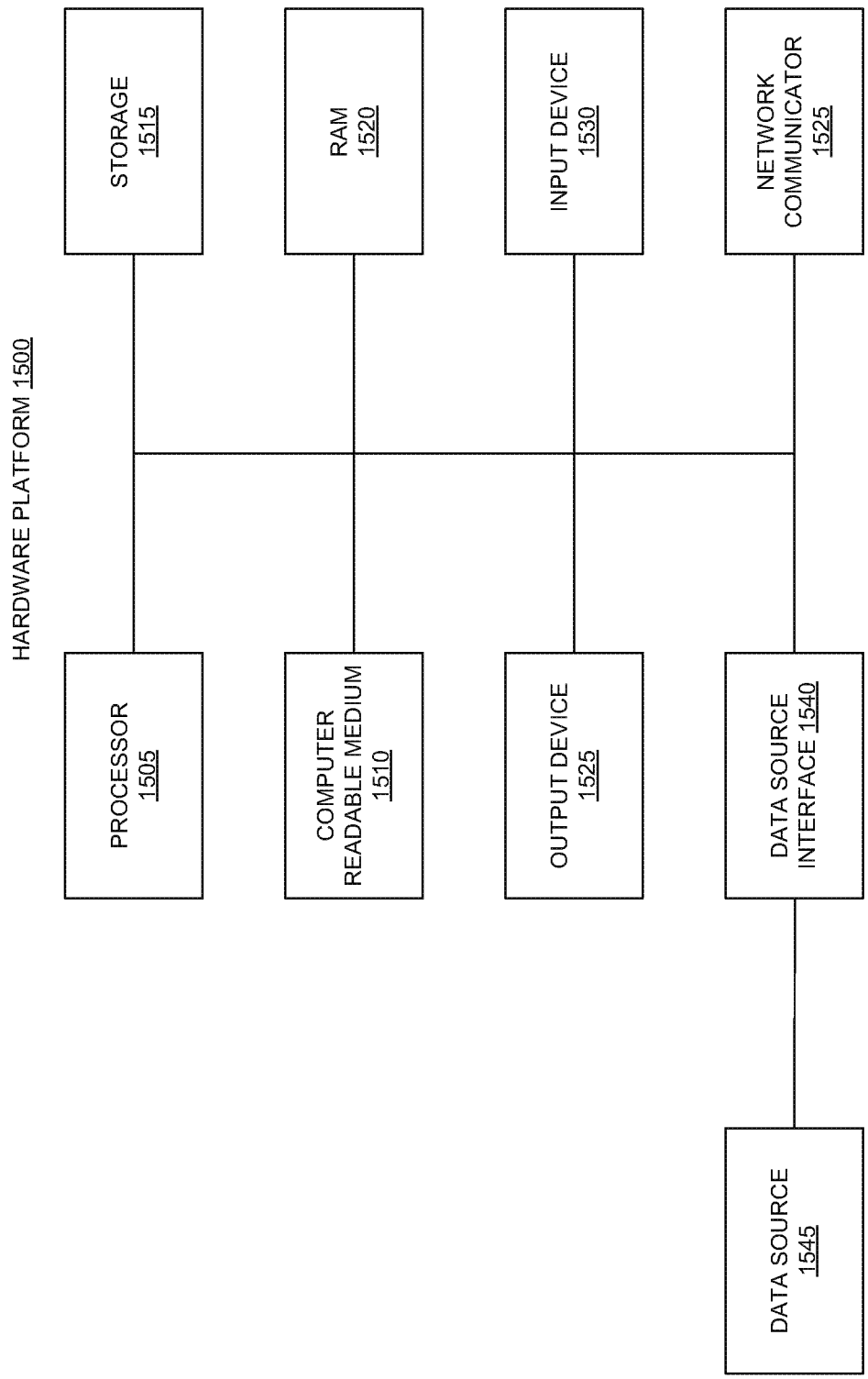
FIG. 15 illustrates a hardware platform for the implementation of a process optimization system, according to an example embodiment of the present disclosure.

FIG. 15 illustrates a hardware platform 1500 for implementation of the system 110, according to an example embodiment of the present disclosure. Particularly, computing machines such as but not limited to internal/external server clusters, quantum computers, desktops, laptops, smartphones, tablets and wearables which may be used to execute the system 110 or may have the structure of the hardware platform 1500. The hardware platform 1500 may include additional components not shown and that some of the components described may be removed and/or modified. In another example, a computer system with multiple GPUs can sit on external-cloud platforms including Amazon Web Services, or internal corporate cloud computing clusters, or organizational computing resources, etc.

Over FIG. 15, the hardware platform 1500 may be a computer system 1500 that may be used with the examples described herein. The computer system 1500 may represent a computational platform that includes components that may be in a server or another computer system. The computer system 1500 may execute, by a processor (e.g., a single or multiple processors) or other hardware processing circuit, the methods, functions and other processes described herein. These methods, functions and other processes may be embodied as machine-readable instructions stored on a computer-readable medium, which may be non-transitory, such as hardware storage devices (e.g., RAM (random access memory), ROM (read-only memory), EPROM (erasable, programmable ROM), EEPROM (electrically erasable, programmable ROM), hard drives, and flash memory). The computer system 1500 may include a processor 1505 that executes software instructions or code stored on a non-transitory computer-readable storage medium 1510 to perform methods of the present disclosure. The software code includes, for example, instructions to gather data and documents and analyze documents. In an example, the data collector 130, the data analyzer 140, the data pruner 150, and the confidence predictor 160 may be software codes or components performing these steps.

The instructions on the computer-readable storage medium 1510 are read and stored the instructions in storage 1515 or in random access memory (RAM) 1520. The storage 1515 provides a large space for keeping static data where at least some instructions could be stored for later execution. The stored instructions may be further compiled to generate other representations of the instructions and dynamically stored in the RAM 1520. The processor 1505 reads instructions from the RAM 1520 and performs actions as instructed.

The computer system 1500 further includes an output device 1525 to provide at least some of the results of the execution as output including, but not limited to, visual information to users, such as external agents. The output device can include a display on computing devices and virtual reality glasses. For example, the display can be a mobile phone screen or a laptop screen. GUIs and/or text are presented as an output on the display screen. The computer system 1500 further includes input device 1530 to provide a user or another device with mechanisms for entering data and/or otherwise interact with the computer system 1500. The input device may include, for example, a keyboard, a keypad, a mouse, or a touchscreen. Each of these output devices 1525 and input devices 1530 could be joined by one or more additional peripherals. In an example, the output device 1525 may be used to display the results of the query 202.

A network communicator 1535 may be provided to connect the computer system 1500 to a network and in turn to other devices connected to the network including other clients, servers, data stores, and interfaces, for instance. A network communicator 1525 may include, for example, a network adapter such as a LAN adapter or a wireless adapter. The computer system 1500 includes a data source interface 1540 to access data source 1545. A data source is an information resource. As an example, a database of exceptions and rules may be a data source. Moreover, knowledge repositories and curated data may be other examples of data sources.

Figure 16A:
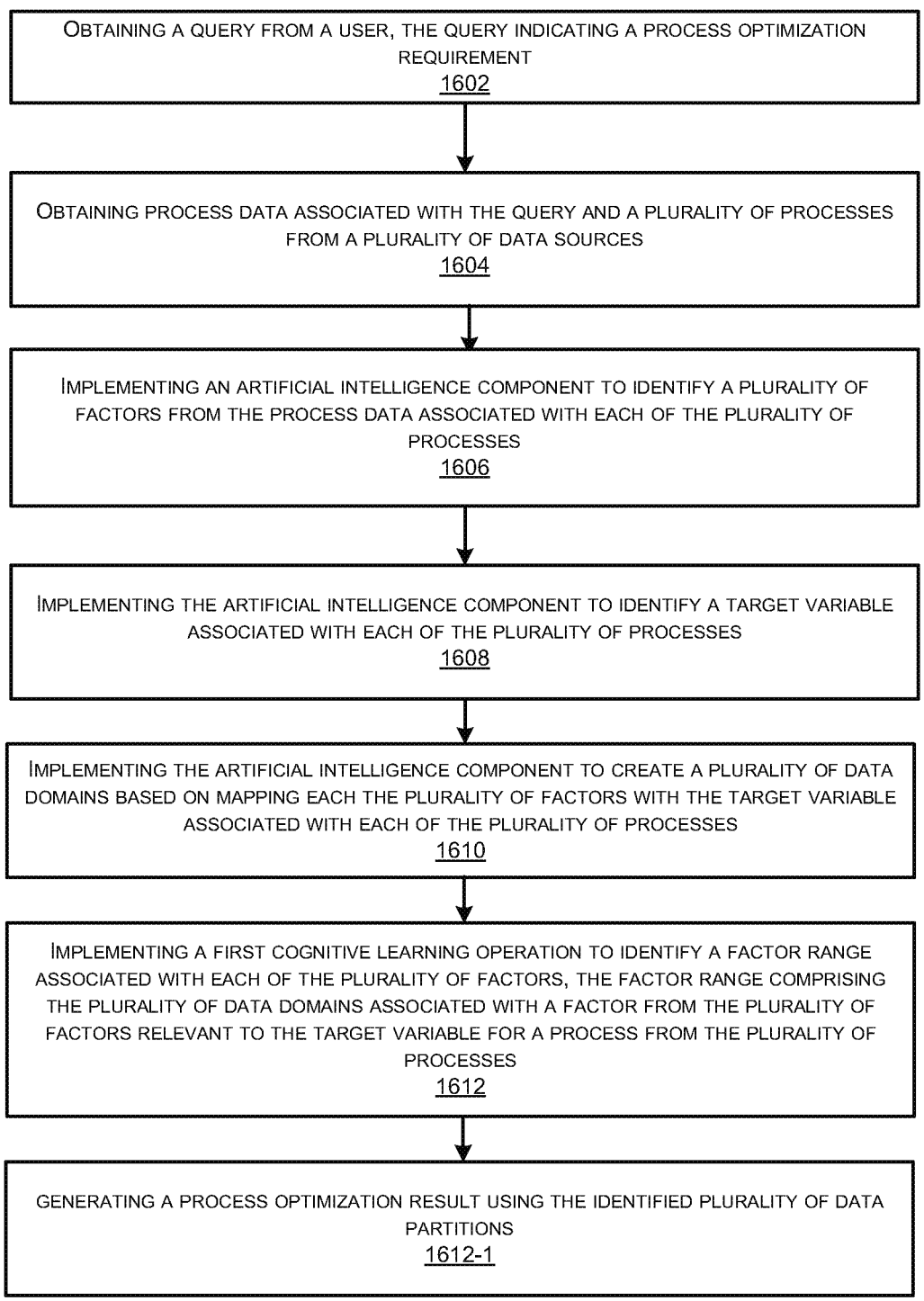
FIGS. 16A and 16B illustrate a process flowchart for process optimization using a process optimization system, according to an example embodiment of the present disclosure.
Figure 16B:
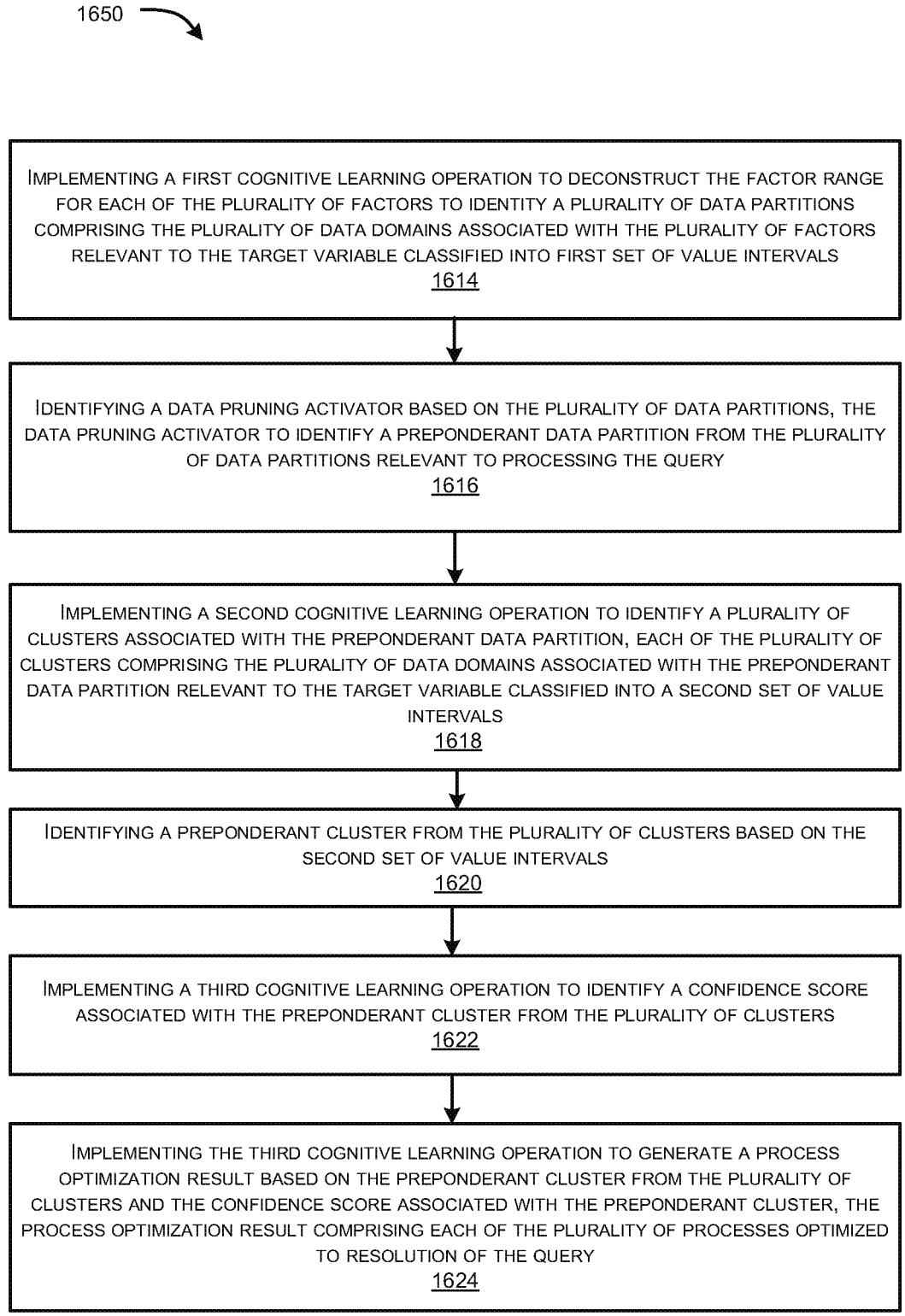

FIGS. 16A and 16B illustrate process flowcharts 1600 and 1650 for process optimization using the process optimization system 110, according to an example embodiment of the present disclosure.

It should be understood that method steps are shown here for reference only and other combinations of the steps may be possible. Further, the method 1600 and 1650 may contain some steps in addition to the steps shown FIGS. 16A and 16B. For the sake of brevity, construction and operational features of the system 110 which are explained in detail in the description of FIGS. 1-15 are not explained in detail in the description of FIGS. 16A and 16B. The method 1600 may be performed by a component of the system 110, such as the processor 120, the data collector 130, the data analyzer 140, the data pruner 150 and the confidence predictor 160.

As illustrated in FIG. 16A, at block 1602, a query 202 may be obtained from a user. The query 202 may be indicating a process optimization requirement.

At block 1604, process data 204 associated with the query 202 and the plurality of processes 206.

At block 1606, the artificial intelligence component 208 may be implemented to identify a plurality of factors 210 from the process data 204 associated with each of the plurality of processes 206.

At block 1608, the artificial intelligence component 208 may be implemented to identify a target variable 212 associated with each of the plurality of processes 206.

At block 1610, the artificial intelligence component 208 may be implemented to create a plurality of data domains 214 based on mapping each the plurality of factors 210 with the target variable 212 associated with each of the plurality of processes 206.

At block 1612, the first cognitive learning operation 216 may be implemented to identify a factor range 218 associated with each of the plurality of factors 210. The factor range 218 may be including the plurality of data domains 214 associated with a factor from the plurality of factors 210 relevant to the target variable 212 for a process from the plurality of processes 206.

At block 1612-1, using the identified plurality of data partitions, a process optimization result 244 may be generated. The process optimization result 244 may include each of the plurality of processes 206 optimized to the resolution of the query 202

Further, FIG. 16B illustrates the process flowchart 1650 for generating the process optimization result 244 using the identified plurality of data partitions. At block 1614, the first cognitive learning operation 216 may be implemented to deconstruct the factor range 218 for each of the plurality of factors 210 to identify a plurality of data partitions 220 including the plurality of data domains 214 associated with the plurality of factors 210 relevant to the target variable 212 classified into the first set of value intervals 222.

At block 1616, a data pruning activator 228 may be identified based on the plurality of data partitions 220. The data pruning activator 228 may identify a preponderant data partition 230 from the plurality of data partitions 220 relevant to processing the query 202 and neglect the remaining plurality of data partitions 220.

At block 1618, the second cognitive learning operation 232 may be implemented to identify a plurality of clusters 234 associated with the preponderant data partition 230. Each of the plurality of clusters 234 may be including the plurality of data domains 214 associated with the preponderant data partition 230 relevant to the target variable 212 classified into a second set of value intervals 238.

At block 1620, the preponderant cluster 236 may be identified from the plurality of clusters 234 based on the second set of value intervals 238.

At block 1622, the third cognitive learning operation 242 may be implemented to identify a confidence score 240 associated with the preponderant cluster 236 from the plurality of clusters 234.

At block 1624, the third cognitive learning operation 242 may be implemented to generate the process optimization result 244 based on the preponderant cluster 236 from the plurality of clusters 234 and the confidence score 240 associated with the preponderant cluster 236.

In an example, the method 1600 and 1650 may further include implementing the artificial intelligence component 208 to determine a priority score for each of the of the plurality of factors 210 based on the target variable associated with each of the plurality of processes 206 and identify a threshold value based on the priority score each the plurality of factors. The priority score may be used to prioritize the plurality of factors 210 associated with each of the plurality of processes 206 based on the target variable 212 associated with each of the plurality of processes 206 and deploy the plurality of factors 210 with a higher priority for resolution of the query 202. The method 1600 may further include identifying the first set of value intervals 222 based on a variation range 224 of the mapping of each the plurality of factors 210 with the target variable 212 associated with each of the plurality of processes 206. The method 1600 may further include identifying the second set of value intervals 238 based on deconstructing a value interval from the first set of value intervals 222. The method 1600 may further include updating the factor range 218 associated with each of the plurality of factors 210 based on an update in the plurality of data domains 214 associated with a factor from the plurality of factors 210 relevant to the target variable 212 for a corresponding process from the plurality of processes 206.

In accordance with various embodiments of the present disclosure, the first cognitive learning operation 216 may be implemented to iteratively deconstruct the factor range 218 for each of the plurality of factors 210 to identify the plurality of data partitions 220 until the identification of a terminal partition 226. Further, the first cognitive learning operation 216 may be implemented to deploy the plurality of data partitions 220 and the terminal partition 226 to construct a decision tree 246 including the plurality of data partitions 220 arranged based on the first set of value intervals 222. The method 1600 may further include implementing the third cognitive learning operation 242 to identify the confidence score 240 to include a correlation between the plurality of factors 210 associated with the preponderant cluster 236 and the associated target variable 212.

In an example, the methods 1600 and 1650 may be practiced using a non-transitory computer-readable medium. In an example, the method 1600 may be a computer-implemented method.

The present disclosure provides for a process optimization system that may generate break-even insights for a process while incurring minimal costs. Furthermore, the present disclosure may categorically analyze various parameters that may have an impact on deciding an appropriate process configuration, thereby optimizing a process from various available configurations.

One of ordinary skill in the art will appreciate that techniques consistent with the present disclosure are applicable in other contexts as well without departing from the scope of the disclosure.

What has been described and illustrated herein are examples of the present disclosure. The terms, descriptions, and figures used herein are set forth by way of illustration only and are not meant as limitations. Many variations are possible within the spirit and scope of the subject matter, which is intended to be defined by the following claims and their equivalents in which all terms are meant in their broadest reasonable sense unless otherwise indicated.

We claim:

1. A system comprising:
   a processor;
   a data collector coupled to the processor, the data collector to:
   implement an artificial intelligence component to:
   identify a plurality of factors from process data associated with each process of a plurality of processes;
   identify a target variable associated with each of the plurality of processes; and
   create a plurality of data domains based on mapping each of the plurality of factors with the target variable associated with each of the plurality of processes; and
   a data analyzer coupled to the processor, the data analyzer to implement a first cognitive learning operation to:
   deconstruct an identified factor range for each of the plurality of factors to identify a plurality of data partitions comprising the plurality of data domains associated with the plurality of factors relevant to the target variable classified into first set of value intervals,
   wherein the system, using the identified plurality of data partitions, generates a process optimization result comprising each of the plurality of processes optimized for resolution of a query.

2. The system as claimed in claim 1, wherein the data collector obtains the process data from a plurality of data sources and the query is obtained from a user, wherein the factor range is identified for each of the plurality of factors prior to deconstruction of the factor range, and the factor range comprises the plurality of data domains associated with a factor from the plurality of factors relevant to the target variable for the process from the plurality of processes.

3. The system as claimed in claim 1, wherein the system comprises a data pruner coupled to the processor, wherein the data pruner facilitates to:
   identify a data pruning activator based on the plurality of data partitions, the data pruning activator to identify a preponderant data partition from the plurality of data partitions relevant to processing the query and neglect the remaining plurality of data partitions;
   implement a second cognitive learning operation to identify a plurality of clusters associated with the preponderant data partition, each of the plurality of clusters comprising the plurality of data domains associated with the preponderant data partition relevant to the target variable classified into a second set of value intervals; and
   identify a preponderant cluster from the plurality of clusters based on the second set of value intervals,
   wherein the data pruner is to identify the second set of value intervals based on deconstructing a value interval from the first set of value intervals.

4. The system as claimed in claim 3, wherein the system comprises a confidence predictor coupled to the processor, wherein the confidence predictor to implement a third cognitive learning operation to:
   identify a confidence score associated with the preponderant cluster from the plurality of clusters; and
   generate the process optimization result based on the preponderant cluster from the plurality of clusters and the confidence score associated with the preponderant cluster.

5. The system as claimed in claim 4, wherein the confidence predictor is to identify the confidence score to include a correlation between the plurality of factors associated with the preponderant cluster and the associated target variable.

6. The system as claimed in claim 3, wherein the data analyzer is to implement the first cognitive learning operation to:
   iteratively deconstruct the factor range for each of the plurality of factors to identify the plurality of data partitions until a terminal partition is identified;
   deploy the plurality of data partitions and the terminal partition to construct a decision tree comprising the plurality of partitions arranged based on the first set of value intervals, the decision tree facilitating identification of the preponderant data partition.

7. The system as claimed in claim 1, wherein the data collector is to implement the artificial intelligence component to:
   determine a priority score for each of the plurality of factors based on the target variable associated with each of the plurality of processes, and
   deploy the plurality of factors with the priority score above a threshold value for resolution of the query.

8. The system as claimed in claim 1, wherein the data analyzer is to identify the first set of value intervals based on a variation range of the mapping of each the plurality of factors with the target variable associated with each of the plurality of processes.

9. The system as claimed in claim 1, wherein the data analyzer is to update the factor range associated with each of the plurality of factors based on an update in the plurality of data domains associated with a factor from the plurality of factors relevant to the target variable for a corresponding process from the plurality of processes.

10. A method comprising:
    obtaining, by a processor, a query from a user, the query indicating a process optimization requirement;
    obtaining, by the processor, process data associated with the query and a plurality of processes from a plurality of data sources;
    implementing, by the processor, an artificial intelligence component to:
    identify a plurality of factors from process data associated with each of the plurality of processes;
    identify a target variable associated with each of the plurality of processes; and
    create a plurality of data domains based on mapping each of the plurality of factors with the target variable associated with each of the plurality of processes;
    implementing, by the processor, a first cognitive learning operation to identify a factor range associated with each of the plurality of factors, the factor range comprising the plurality of data domains associated with a factor from the plurality of factors relevant to the target variable for a process from the plurality of processes;

implementing, by the processor, the first cognitive learning operation to deconstruct the factor range for each of the plurality of factors to identify a plurality of data partitions comprising the plurality of data domains associated with the plurality of factors relevant to the target variable classified into first set of value intervals; and generating, by the processor, using the identified plurality of data partitions, a process optimization result, wherein the process optimization result comprises each of the plurality of processes optimized for resolution of the query.

11. The method as claimed in claim 10, wherein the method further comprises:
identifying, by the processor, a data pruning activator based on the plurality of data partitions, the data pruning activator to identify a preponderant data partition from the plurality of data partitions relevant to processing the query and neglect the remaining plurality of data partitions;
implementing, by the processor, a second cognitive learning operation to identify a plurality of clusters associated with the preponderant data partition, each of the plurality of clusters comprising the plurality of data domains associated with the preponderant data partition relevant to the target variable classified into a second set of value intervals; and
identifying, by the processor, a preponderant cluster from the plurality of clusters based on the second set of value intervals.

12. The method as claimed in claim 11, wherein the method further comprises:
implementing, by the processor, a third cognitive learning operation to identify a confidence score associated with the preponderant cluster from the plurality of clusters; and
implementing, by the processor, the third cognitive learning operation to generate the process optimization result based on the preponderant cluster from the plurality of clusters and the confidence score associated with the preponderant cluster.

13. The method as claimed in claim 12, wherein the method further comprises identifying, by the processor, the confidence score to include a correlation between the plurality of factors associated with the preponderant cluster and the associated target variable.

14. The method as claimed in claim 11, wherein the method further comprises implementing, by the processor, the first cognitive learning operation to:
iteratively deconstruct the factor range for each of the plurality of factors to identify the plurality of data partitions until a terminal partition is identified; and
deploy the plurality of data partitions and the terminal partition to construct a decision tree comprising the plurality of partitions arranged based on the first set of value intervals, the decision tree facilitating identification of the preponderant data partition.

15. The method as claimed in claim 10, wherein the method further comprises implementing, by the processor, the artificial intelligence component to:
determine a priority score for each of the plurality of factors based on the target variable associated with each of the plurality of processes; and deploy the plurality of factors with the priority score above a threshold value for resolution of the query.

16. The method as claimed in claim 10, wherein the method further comprises identifying, by the processor, the first set of value intervals based on a variation range of the mapping of each the plurality of factors with the target variable associated with each of the plurality of processes.

17. The method as claimed in claim 10, wherein the method further comprises identifying, by the processor, the second set of value intervals based on deconstructing a value interval from the first set of value intervals.

18. The method as claimed in claim 10, wherein the method further comprises updating, by the processor, the factor range associated with each of the plurality of factors based on an update in the plurality of data domains associated with a factor from the plurality of factors relevant to the target variable for a corresponding process from the plurality of processes.

19. A non-transitory computer readable medium including machine readable instructions that are executable by a processor to:
obtain a query from a user, the query indicating a process optimization requirement;
obtain process data associated with the query and a plurality of processes from a plurality of data sources;
implement an artificial intelligence component to:
identify a plurality of factors from the process data associated with each of the plurality of processes;
identify a target variable associated with each of the plurality of processes, and;
create a plurality of data domains based on mapping each of the plurality of factors with the target variable associated with each of the plurality of processes;
implement a first cognitive learning operation to identify a factor range associated with each of the plurality of factors, the factor range comprising the plurality of data domains associated with a factor from the plurality of factors relevant to the target variable for a process from the plurality of processes;
implement the first cognitive learning operation to deconstruct the factor range for each of the plurality of factors to identify a plurality of data partitions comprising the plurality of data domains associated with the plurality of factors relevant to the target variable classified into first set of value intervals; and
generate, using the identified plurality of data partitions, a process optimization result, wherein the process optimization result comprises each of the plurality of processes optimized for resolution of the query.

20. The non-transitory computer readable medium as claimed in claim 19, the non-transitory computer readable medium including machine readable instructions that are executable by the processor to:
identify a data pruning activator based on the plurality of data partitions, the data pruning activator to identify a preponderant data partition from the plurality of data partitions relevant to processing the query and neglect the remaining plurality of data partitions;
implement a second cognitive learning operation to identify a plurality of clusters associated with the preponderant data partition, each of the plurality of clusters comprising the plurality of data domains associated with the preponderant data partition relevant to the target variable classified into a second set of value intervals;

identify a preponderant cluster from the plurality of clusters based on the second set of value intervals;

implement a third cognitive learning operation to identify a confidence score associated with the preponderant cluster from the plurality of clusters; and implement the third cognitive learning operation to generate the process optimization result based on the preponderant cluster from the plurality of clusters and the confidence score associated with the preponderant cluster.

* * * * *